US012764657B2

(12) United States Patent

Elshafie et al.

(10) Patent No.: US 12,764,657 B2
(45) Date of Patent: Oct. 13, 2026

(54) LOW-POWER CELL WAKE-UP SIGNAL FOR CELL DISCONTINUOUS RECEPTION

(71) Applicant: QUALCOMM Incorporated, San Diego, CA (US)

(72) Inventors: Ahmed Elshafie, San Diego, CA (US); Krishna Kiran Mukkavilli, San Diego, CA (US); Marwen Zorgui, San Diego, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 18/168,270

(22) Filed: Feb. 13, 2023

(65) Prior Publication Data

US 2024/0276364 A1 Aug. 15, 2024

(51) Int. Cl.
*H04W 52/02* (2009.01)
*H04W 76/28* (2018.01)

(52) U.S. Cl.
CPC ....... *H04W 52/0206* (2013.01); *H04W 76/28* (2018.02)

(58) Field of Classification Search
CPC .......................... H04W 52/0206; H04W 76/28
See application file for complete search history.

(56) References Cited

U.S. PATENT DOCUMENTS 10,356,839 B2 7/2019 Ang et al.
11,490,333 B2 * 11/2022 Gupta ................. H04W 52/028
12,389,332 B2 * 8/2025 Nimbalker ........ H04W 52/0232
2014/0161010 A1 * 6/2014 Merlin .............. H04W 52/0235 370/311
2015/0189592 A1 * 7/2015 Jafarian ............ H04W 52/0216 370/311
2015/0318942 A1 * 11/2015 Jafarian ................ H04L 5/0092 370/336

(Continued)

FOREIGN PATENT DOCUMENTS

EP 3634082 4/2020
WO 2016073087 5/2016

(Continued)

OTHER PUBLICATIONS

International Search Report and Written Opinion—PCT/US2024/011587—ISA/EPO—May 24, 2024.

*Primary Examiner* — Parth Patel
(74) *Attorney, Agent, or Firm* — Harrity & Harrity LLP

(57) ABSTRACT

Various aspects of the present disclosure generally relate to wireless communication. In some aspects, a user equipment (UE) may receive, from a network node, an indication of a network capability for low power cell wake-up signal (LP-C-WUS) reception. The UE may transmit, to the network node, an indication of a UE capability for LP-C-WUS transmission. The UE may receive, from the network node, a cell discontinuous reception (DRX) configuration indicating one or more LP-C-WUS monitoring occasions in a cell DRX cycle. The UE may transmit, to the network node, an LP-C-WUS in an LP-C-WUS occasion of the one or more LP-C-WUS occasions. Numerous other aspects are described.

30 Claims, 18 Drawing Sheets

(56) References Cited

U.S. PATENT DOCUMENTS

| | | | | |
|---|---|---|---|---|
| 2015/0319609 | A1* | 11/2015 | Asterjadhi | H04W 8/22 370/328 |
| 2019/0075520 | A1* | 3/2019 | Li | H04W 52/0216 |
| 2019/0166556 | A1* | 5/2019 | Ly | H04W 52/0219 |
| 2019/0246356 | A1* | 8/2019 | Kim | H04W 80/02 |
| 2020/0015166 | A1* | 1/2020 | Ahn | H04L 27/0008 |
| 2020/0196241 | A1* | 6/2020 | Lou | H04W 52/0229 |
| 2020/0267646 | A1* | 8/2020 | Nam | H04W 52/0235 |
| 2020/0267650 | A1* | 8/2020 | Lee | H04W 16/14 |
| 2020/0275368 | A1* | 8/2020 | Puchko | H04W 52/02 |
| 2020/0314755 | A1* | 10/2020 | Sarkis | H04W 52/0219 |
| 2020/0328863 | A1* | 10/2020 | Jia | H04W 52/0274 |
| 2020/0413340 | A1* | 12/2020 | Nam | H04W 52/028 |
| 2021/0058865 | A1* | 2/2021 | Xu | H04W 52/0216 |
| 2021/0136862 | A1* | 5/2021 | He | H04B 17/318 |
| 2021/0195521 | A1* | 6/2021 | Müller | H04W 76/28 |
| 2022/0022107 | A1* | 1/2022 | Bao | H04W 76/28 |
| 2022/0046744 | A1* | 2/2022 | Bao | H04W 72/23 |
| 2022/0053530 | A1* | 2/2022 | Ahmed | H04W 76/28 |
| 2022/0124622 | A1* | 4/2022 | Islam | H04W 72/20 |
| 2022/0232476 | A1* | 7/2022 | Reial | H04W 24/10 |
| 2022/0256459 | A1* | 8/2022 | Huang | H04W 52/0209 |
| 2023/0043789 | A1* | 2/2023 | Maleki | H04W 76/28 |
| 2024/0014870 | A1* | 1/2024 | Ben Hadj Fredj | H04B 7/0639 |
| 2024/0098645 | A1* | 3/2024 | Ye | H04W 76/27 |
| 2024/0121713 | A1* | 4/2024 | Koskinen | H04W 52/0229 |
| 2024/0276364 | A1* | 8/2024 | Elshafie | H04W 52/0206 |
| 2024/0292332 | A1* | 8/2024 | Li | H04W 52/0229 |
| 2024/0340800 | A1* | 10/2024 | He | H04W 52/02 |
| 2025/0081103 | A1* | 3/2025 | Zhou | H04W 76/27 |
| 2025/0088968 | A1* | 3/2025 | Mazloum | H04W 52/0274 |
| 2025/0126563 | A1* | 4/2025 | Niu | H04W 52/0235 |
| 2025/0133498 | A1* | 4/2025 | Li | H04W 52/0216 |
| 2025/0220582 | A1* | 7/2025 | Li | H04W 68/02 |

FOREIGN PATENT DOCUMENTS

| | | | | |
|---|---|---|---|---|
| WO | WO-2019006030 A1 * | 1/2019 | | H04L 25/4902 |
| WO | 2022170247 A1 | 8/2022 | | |
| WO | WO-2024166533 A1 * | 8/2024 | | H04W 56/00 |

* cited by examiner

LOW-POWER CELL WAKE-UP SIGNAL FOR CELL DISCONTINUOUS RECEPTION

FIELD OF THE DISCLOSURE

Aspects of the present disclosure generally relate to wireless communication and to techniques and apparatuses for cell discontinuous reception (DRX) with a low-power cell wake-up signal (LP-C-WUS).

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving, from a network node, an indication of a network capability for low power cell wake-up signal (LP-C-WUS) reception. The method includes transmitting, to the network node, an indication of a UE capability for LP-C-WUS transmission. The method includes receiving, from the network node, a cell discontinuous reception (DRX) configuration indicating one or more LP-C-WUS monitoring occasions in a cell DRX cycle. The method may include transmitting, to the network node, an LP-C-WUS in an LP-C-WUS occasion of the one or more LP-C-WUS occasions.

Another aspect provides a method for wireless communication by a network node. The method includes transmitting an indication of a network capability for LP-C-WUS reception. The method may include receiving an indication of a UE capability for LP-C-WUS transmission. The method may include transmitting a cell DRX configuration indicating one or more LP-C-WUS monitoring occasions in a cell DRX cycle. The method may include receiving an LP-C-WUS in an LP-C-WUS occasion of the one or more LP-C-WUS occasions.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
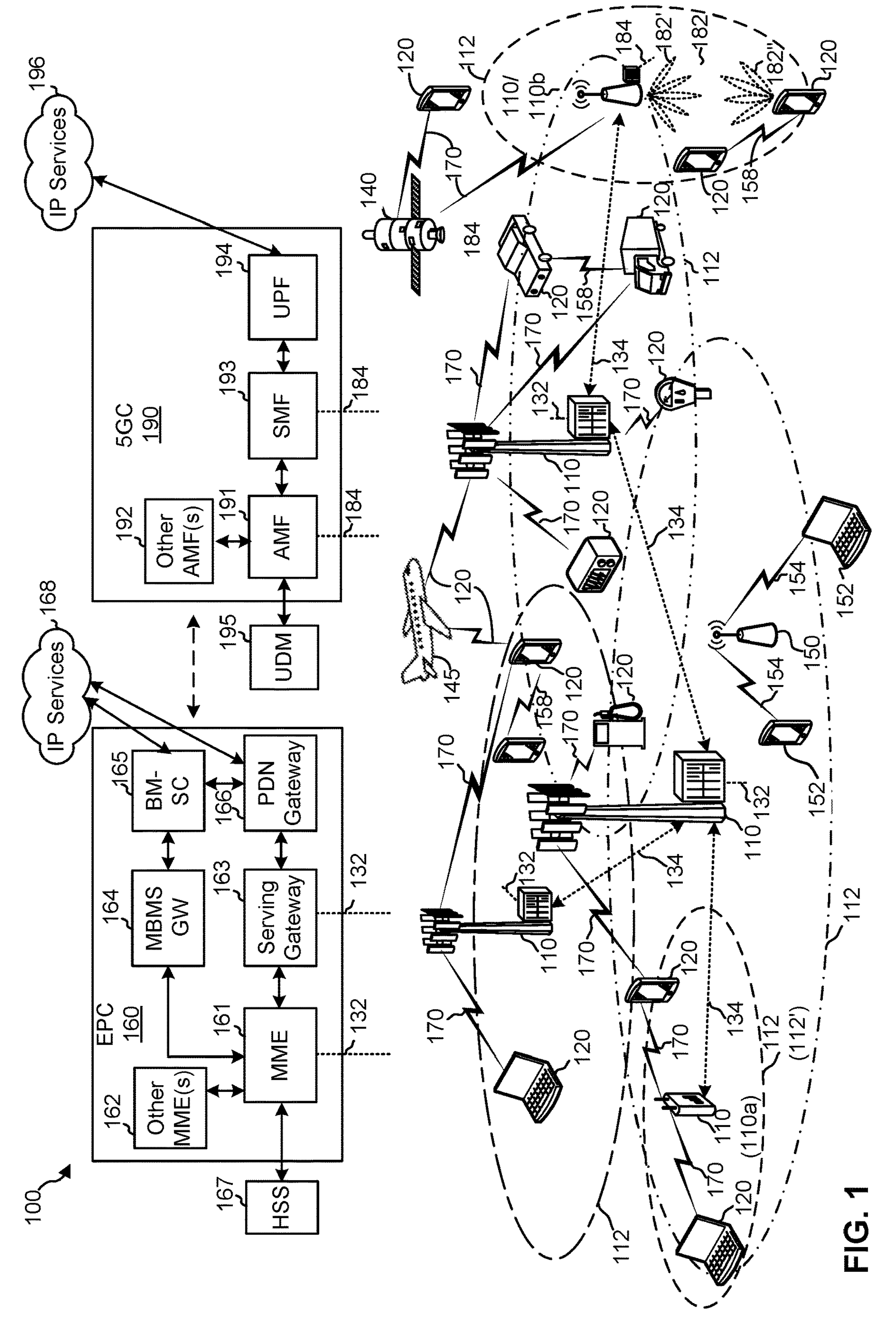
FIG. 1 depicts an example of a wireless communications network, in accordance with the present disclosure.

Aspects of the present disclosure provide apparatuses, methods, processing systems, and computer-readable mediums for cell discontinuous reception (DRX) with a low-power cell wake-up signal (LP-C-WUS).

For various reasons, including climate change mitigation, environmental sustainability, and network cost reduction, network energy saving (NES) and/or network energy efficiency measures are expected to have increased importance in wireless network operations. For example, although New Radio (NR) generally offers a significant energy efficiency improvement per gigabyte over previous generations (for example, Long Term Evolution (LTE)), new NR use cases and/or the adoption of millimeter wave frequencies may require more network sites, more network antennas, larger bandwidths, and/or more frequency bands, which could potentially lead to more efficient wireless networks that nonetheless have higher energy requirements and/or cause more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). The largest proportion of energy consumption and/or energy costs are associated with a radio access network (RAN), which accounts for about half of the energy consumption in a wireless network, with data centers and fiber transport accounting for smaller shares. Accordingly, measures to increase network energy savings and/or improve network energy efficiency are important factors that may drive adoption and/or expansion of wireless networks.

One potential technique to increase energy efficiency in a RAN may be to enable a cell DRX mechanism. For example, the cell DRX mechanism may include a cell DRX on duration (or active time), during which a network node (e.g., a base station or one or more components of a disaggregated base station architecture) transmits and/or receives one or more channels or signals, and an opportunity for the network node to enter a sleep state during a time (e.g., a cell DRX off duration or inactive time) a when an entire cell (e.g., including the network node 110 and any connected mode user equipments (UEs)) is sleeping. In some examples, the network node may not transmit or receive while in the sleep state. However, a UE may need to communicate with the network node. In some examples, a UE may transmit a cell wake-up signal (C-WUS) to proactively wake-up the network node. The C-WUS may be a physical layer signal, such as a physical random access channel (PRACH) or a scheduling request (SR). The network node may periodically switch to the active state to monitor for the C-WUS, and the network node may remain in the active state if a C-WUS is detected. The network may return to the sleep state, after monitoring for the C-WUS, if non C-WUS is detected. However, the use of the physical channel C-WUS to wake-up the network node from the sleep state may result in increased latency for communications between a UE and the network node because the UE may have to wait for a C-WUS monitoring occasion to transmit the C-WUS to the network node. Furthermore, reducing the time period between C-WUS monitoring occasions may reduce the network power savings from the cell DRX.

Some techniques described herein provide cell DRX with an LP-C-WUS to wake-up a network node from a sleep state. In some aspects, the network node may include a low-power wake-up radio (LP-WUR) and a main radio. The main radio may be switched to the sleep state in accordance with a cell DRX cycle. The LP-WUR may be a radio receiver circuit with very low energy consumption that is capable of receiving a transmission of the LP-C-WUS while the main radio is in the sleep state. In some aspects, a UE may receive, from the network node, a cell DRX configuration that includes one or more LP-C-WUS monitoring occasions, in which the LP-WUR of the network node monitors for an LP-C-WUS transmitted by a UE. The UE may transmit the LP-C-WUS in an LP-C-WUS monitoring occasion.

As a result, by using the LP-WUR to monitor for the LP-C-WUS, the network node may reduce network power consumption as compared to switching the main radio to the active state to monitor for a non-low-power (non-LP) C-WUS (e.g., a physical channel layer C-WUS). This may also allow the network to increase the time period between monitoring occasions for a non-LP C-WUS or replace the monitoring occasions for the non-LP C-WUS with LP-C-WUS monitoring, which may further reduce network power consumption. Furthermore, because the LP-WUR of the network node can monitor for the LP-C-WUS while the main radio remains in a sleep state, the LP-WUR may monitor for the LP-C-WUS between monitoring occasions for the non-LP C-WUS, which may improve the latency of communications between one or more UEs and the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
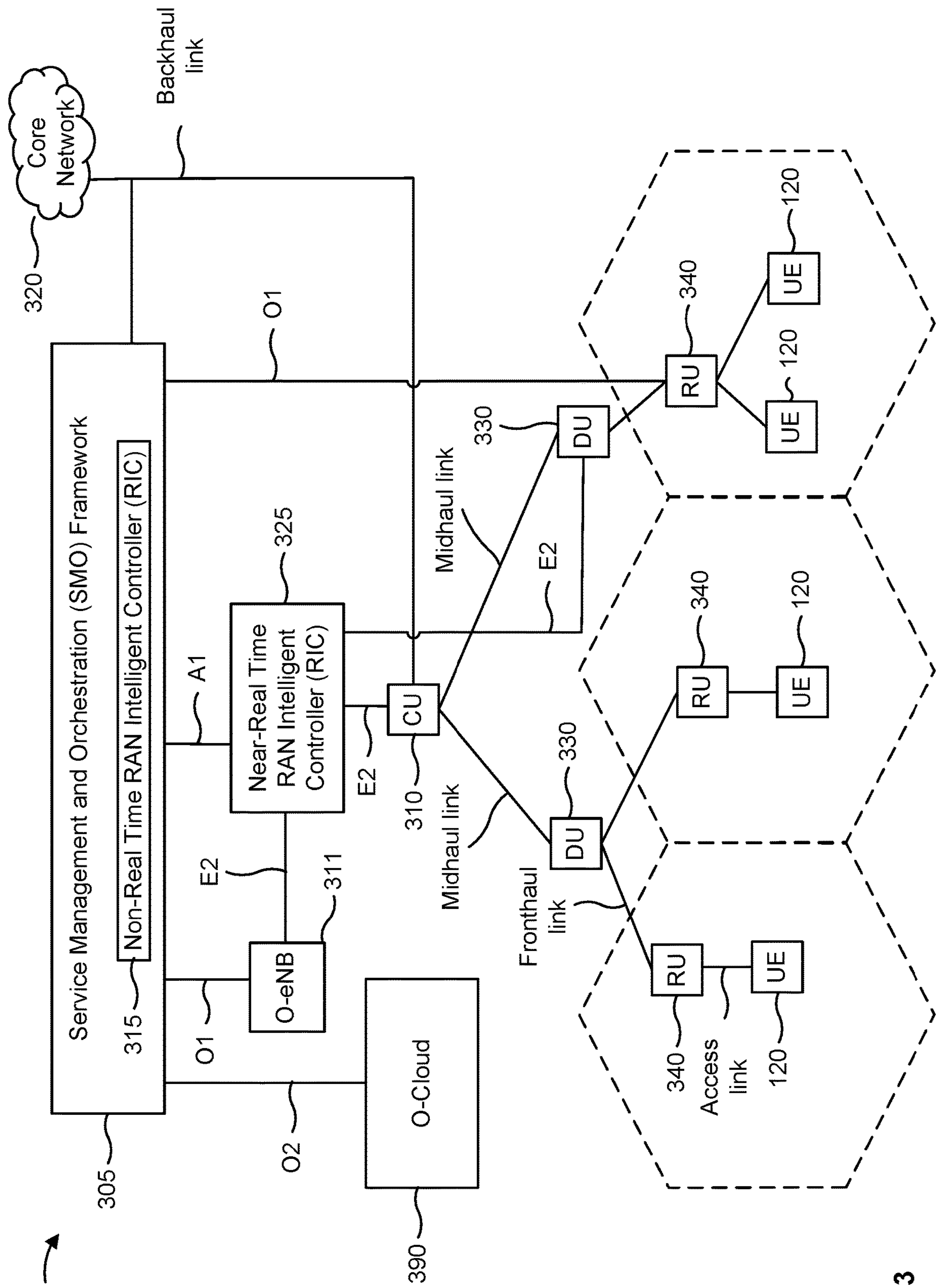
FIG. 3 depicts an example disaggregated base station architecture, in accordance with the present disclosure.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated RAN architecture, such as an Open RAN (O-RAN) architecture or a Virtualized RAN (vRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
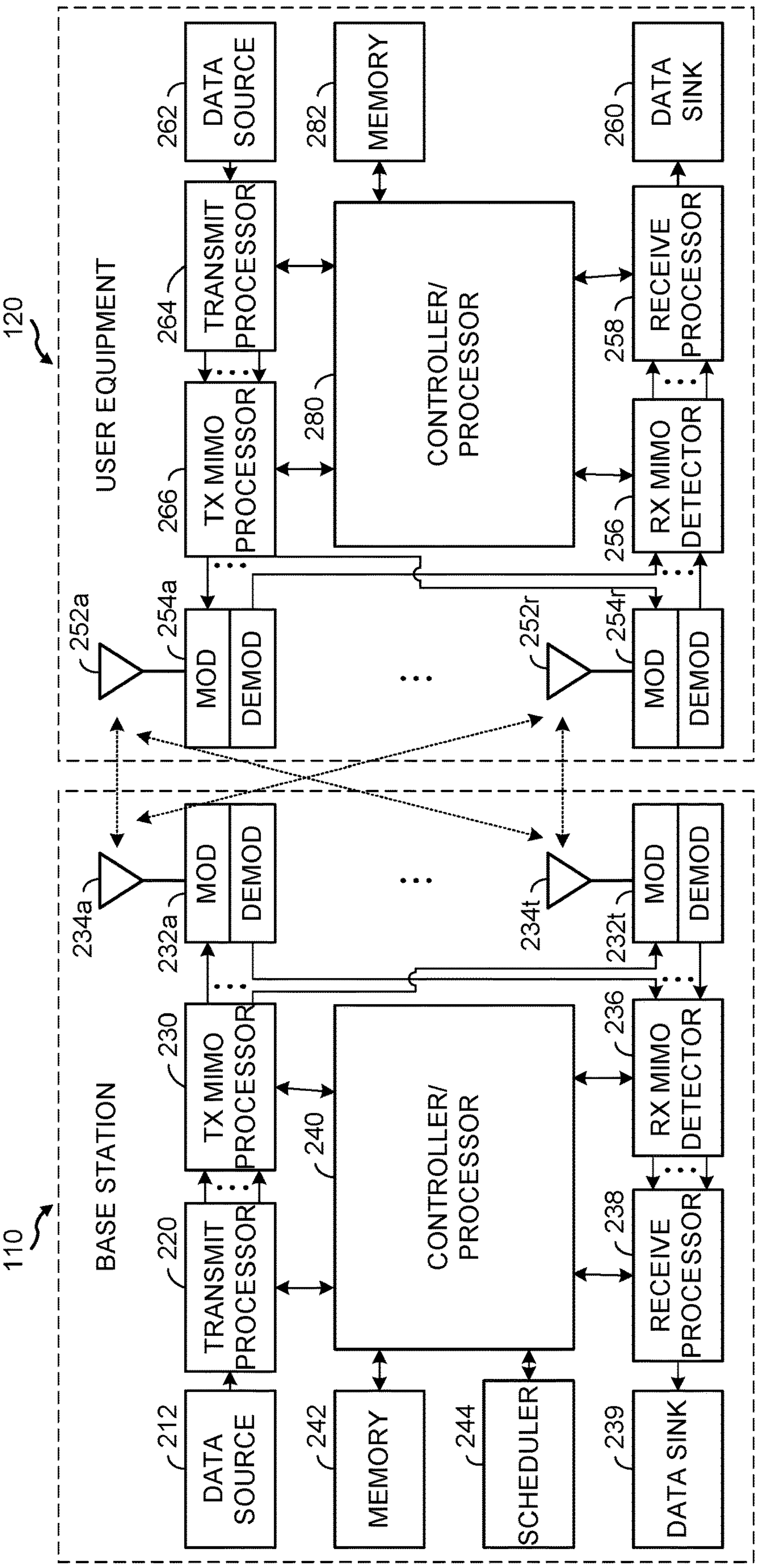
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

Receive (RX) MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, “transmitting” may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, “receiving” may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, “transmitting” may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, “receiving” may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an O-RAN (such as the network configuration sponsored by the O-RAN Alliance), or a vRAN (also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, PRACH extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
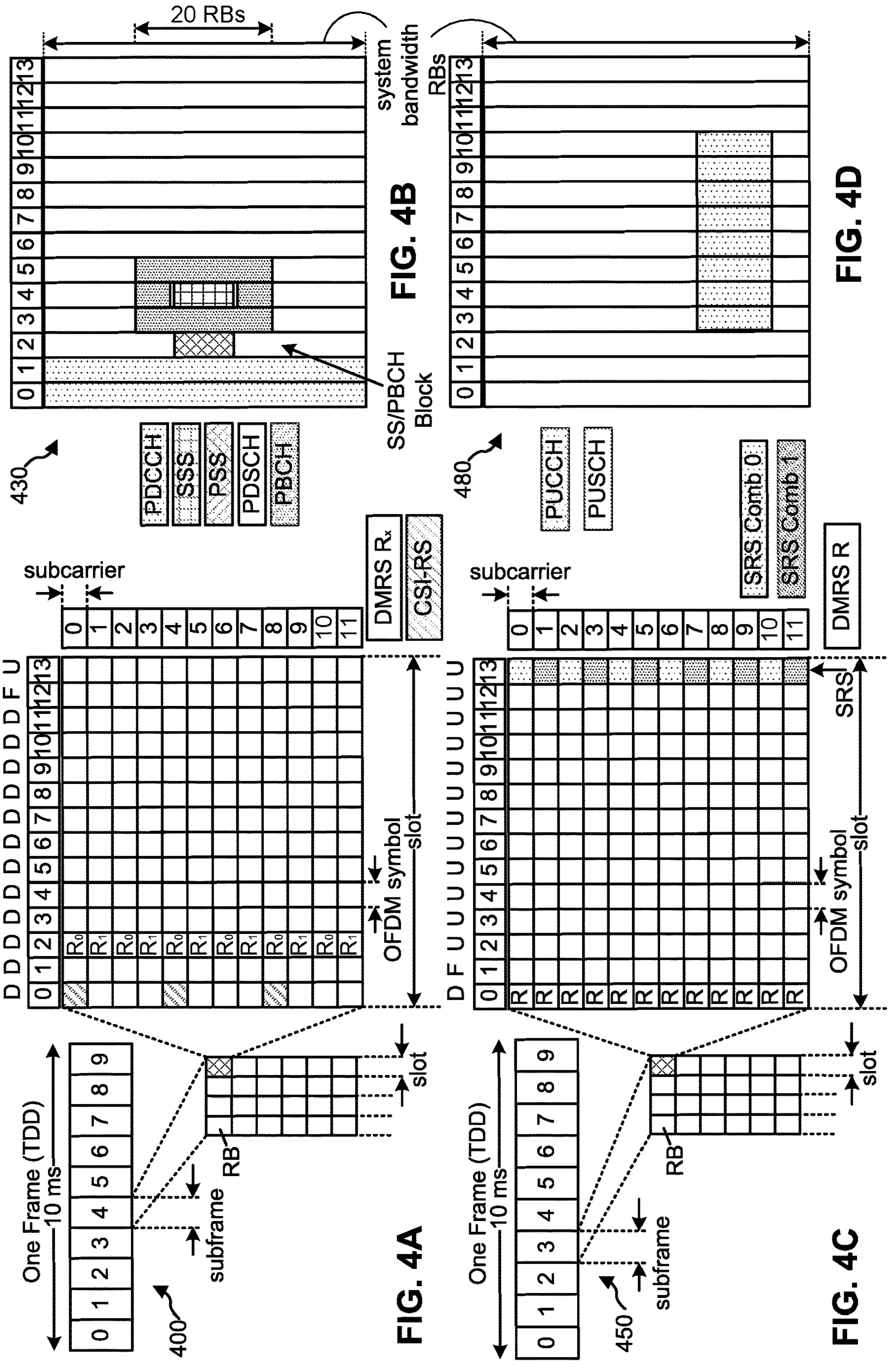
FIGS. 4A, 4B, 4C, and 4D depict aspects of data structures for a wireless communications network, such as wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}\times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
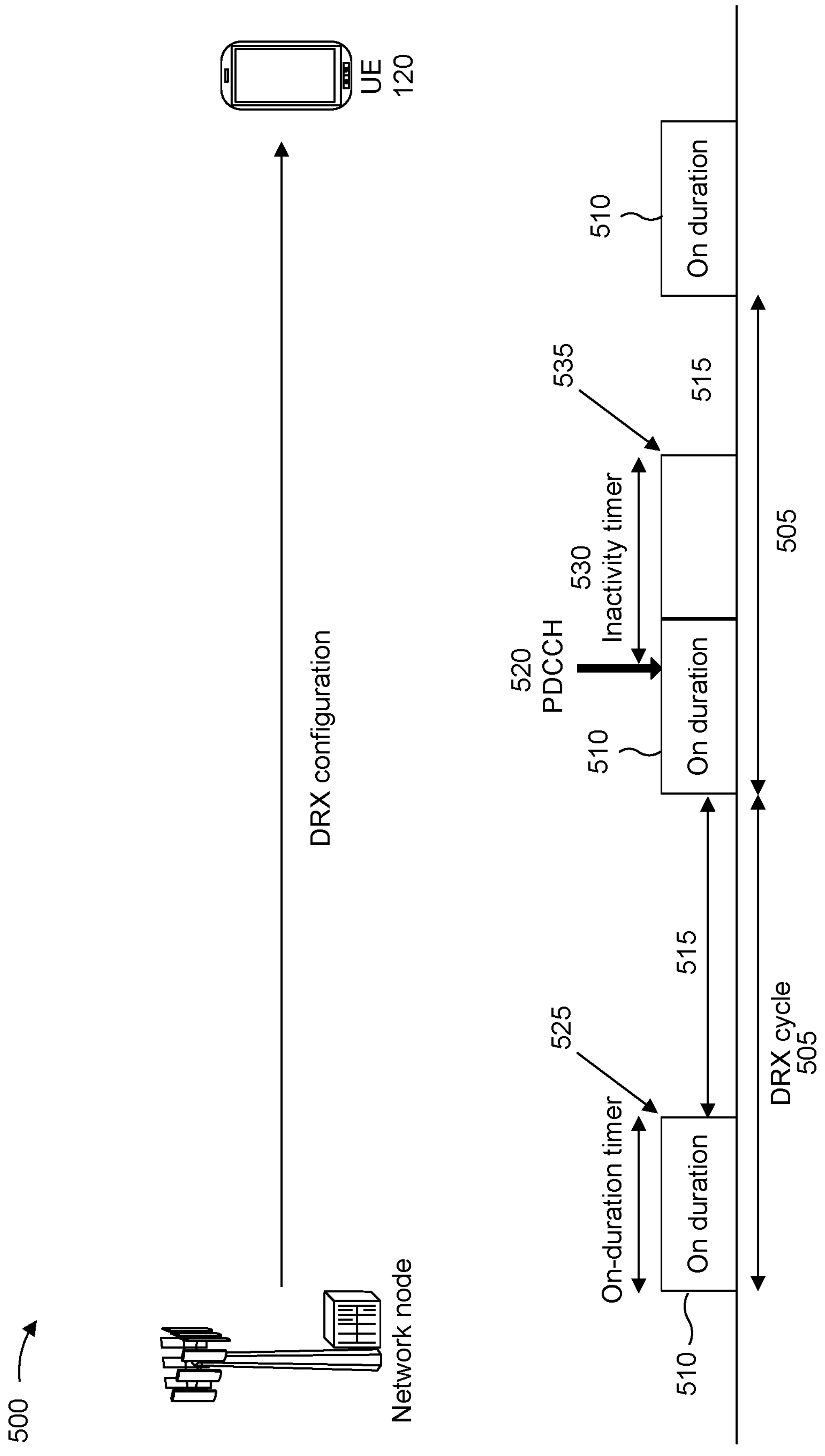
FIG. 5 is a diagram illustrating an example of a discontinuous reception (DRX) configuration, in accordance with the present disclosure.

FIG. 5 is a diagram illustrating an example 500 of a DRX configuration, in accordance with the present disclosure.

As shown in FIG. 5, a network node (e.g., BS 110 or a disaggregated base station as discussed with respect to FIG. 3) may transmit a DRX configuration to a UE 120 to configure a DRX cycle 505 for the UE 120. In some cases, the DRX configuration may be a connected mode DRX configuration (C-DRX) that is provided to the UE 120 when the UE 120 is in a connected mode. Furthermore, the DRX configuration may be specific to the UE 120 (e.g., the network node may configure separate DRX cycles 505 for different UEs 120). As described herein, a DRX cycle 505 may include a DRX on duration 510 (e.g., during which a UE 120 is awake or in an active state) and an opportunity to enter a DRX sleep state 515. As used herein, the time during which the UE 120 is configured to be in an active state (e.g., during the DRX on duration 510 and any time during which a DRX inactivity timer 530 is running) may be referred to as an active time or a DRX active time, and the time during which the UE 120 is configured to be in the DRX sleep state 515 may be referred to as an inactive time or a DRX inactive time. As described below, the UE 120 may monitor a PDCCH during the DRX active time, and may refrain from monitoring the PDCCH during the DRX inactive time.

During the DRX on duration 510 (e.g., the active time), the UE 120 may monitor a downlink control channel (e.g., a PDCCH), as shown by reference number 520. For example, the UE 120 may monitor the PDCCH for DCI pertaining to the UE 120. If the UE 120 does not detect and/or successfully decode any PDCCH communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 530 (e.g., which may extend the DRX active time). The UE 120 may start the DRX inactivity timer 530 at a time at which the PDCCH communication is received (e.g., in a transmission time interval (TTI) in which the PDCCH communication is received, such as a slot or a subframe). The UE 120 may remain in the active state until the DRX inactivity timer 530 expires, at which time the UE 120 may enter the sleep state 515 (e.g., for the DRX inactive time), as shown by reference number 535. During the duration of the DRX inactivity timer 530, the UE 120 may continue to monitor for PDCCH communications, may obtain a downlink data communication (e.g., on a downlink data channel, such as a PDSCH) scheduled by the PDCCH communication, and/or may prepare and/or transmit an uplink communication (e.g., on a PUSCH) scheduled by the PDCCH communication. The UE 120 may restart the DRX inactivity timer 530 after each detection of a PDCCH communication for the UE 120 for an initial transmission (e.g., but not for a retransmission). By operating in this manner, the UE 120 may conserve battery power and reduce power consumption by entering the sleep state 515 during the DRX inactive time.

Figure 6:
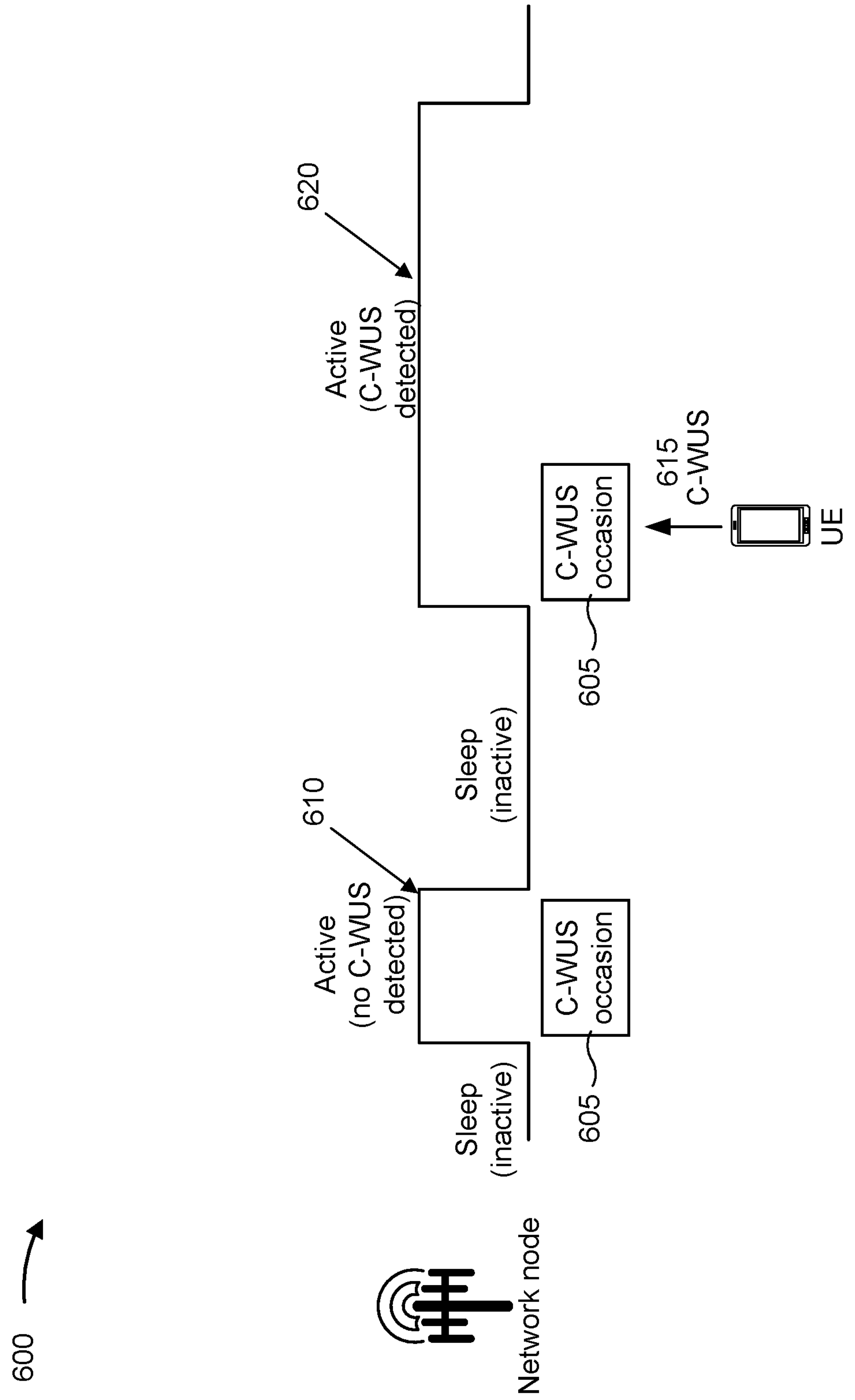
FIG. 6 is a diagram illustrating an example of cell DRX, in accordance with the present disclosure.

FIG. 6 is a diagram illustrating an example 600 of cell DRX, in accordance with the present disclosure.

One potential technique to increase energy efficiency in a RAN may be to enable cell DRX. In some aspects, a network node may transmit (e.g., to one or more UEs) a cell DRX configuration to configure a cell DRX cycle. The cell DRX configuration may configure time periods in which a network node does not receive transmissions from UEs in the cell, which allows the network node to enter a sleep state. The cell DRX configuration may configure discontinuous transmission (DTX) for one or more UEs in the cell. The cell DRX configuration may also be referred to as a DTX/DRX configuration or a DTX configuration for a UE. The cell DRX configuration may have similar characteristics as a DRX configuration that may be configured for a UE. For example, the cell DRX cycle may include a cell DRX on duration (or active time), during which the network node is awake and in an active state, and a cell DRX off duration (or inactive time), during which the network node is configured to be in a sleep state. The network node may not transmit or receive channels or signals while in the sleep state. For example, the network node may not receive or monitor for uplink channel communications, random access channel (RACH) communications, or uplink reference signals, among other examples, during the cell DRX inactive time.

In some examples, the cell DRX configuration may be activated during times of the day (e.g., off-peak times) in which there is no traffic or a light traffic load in the cell. However, the network node may still be required to periodically broadcast signals and/or channels, such as SSBs and system information (SI). Furthermore, the network node may still need to periodically monitor PRACH occasions for possible RACH or small data transmission (SDT) from a UE that is not is an RRC connected mode. All such periodic transmission and monitoring requires the network node to be in the active state, and thus limits network power savings that can be achieved from cell DRX. In some examples, if the network node knows that there are no connected UEs or a light traffic load in the cell, the network node may stop or slow down periodic transmission and/or periodic monitoring to achieve network power savings. However, in some cases, the network node may not be aware of whether one or more UEs need to switch to a connected state (e.g., RRC connected mode) or perform some SDT so the network node can transition to the active state. In some aspects, such UEs may proactively wake up the network node by sending a C-WUS. The C-WUS may be a physical layer signal, such as a PRACH or SR.

As shown in FIG. 6, the cell DRX cycle may be configured with periodic C-WUS monitoring occasions 605 that are aligned with cell DRX on durations. The network node may switch to the active state to monitor for a C-WUS during each C-WUS monitoring occasion 605. As shown by reference number 610, if the network node does not detect a C-WUS during a C-WUS monitoring occasion, the network node may enter the sleep state (e.g., for the inactive time or cell DRX off duration) at the end of the C-WUS monitoring occasion. As shown by reference number 615, a UE may transmit a C-WUS to the UE during a C-WUS monitoring occasion 605. As shown by reference number 620, if the network node detects the C-WUS during a C-WUS monitoring occasion 605, the network node may remain in the active state after the C-WUS monitoring occasion. For example, the network node may remain in the active state for the duration of a timer that extends the cell DRX active time (e.g., a cell DRX inactivity timer). The network node may communicate with the UE that transmitted the C-WUS while the network node is in the active state. For example, the network node may transmit SSBs, an SIB type 1 (SIB1), and/or serve the UE for uplink data reception, among other examples.

As indicated above, FIG. 6 is provided as an example. Other examples may differ from what is described with respect to FIG. 6.

Figure 7:
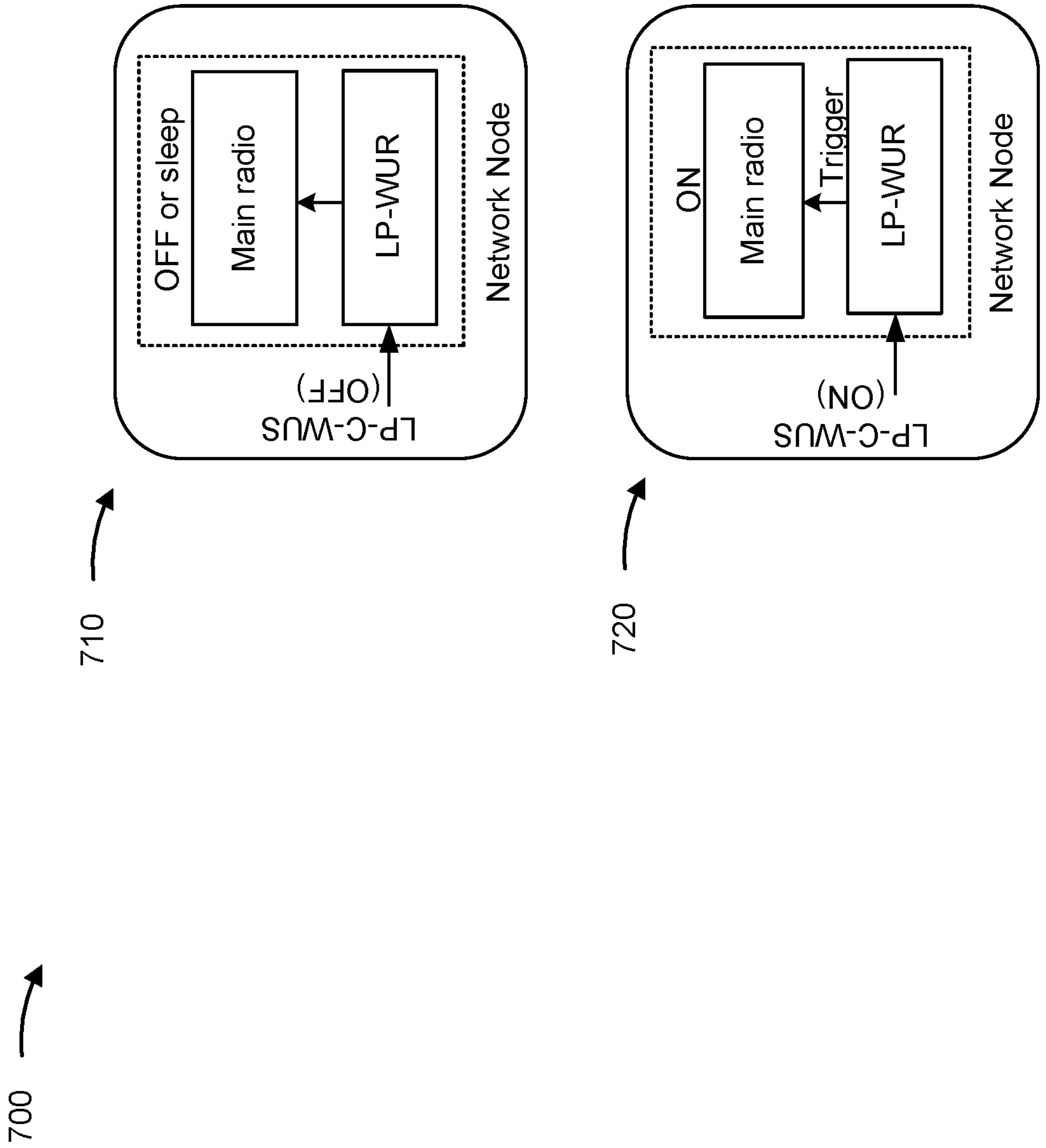
FIG. 7 is a diagram illustrating an example of network node with a low power wake-up radio (LP-WUR), in accordance with the present disclosure.

FIG. 7 is a diagram illustrating an example 700 of network node with an LP-WUR, in accordance with the present disclosure. As shown in FIG. 7, in some aspects, a network node (e.g., BS 110 or one or more components of a disaggregated base station as discussed with respect to FIG. 3) may be equipped with a communication system that includes a main radio (MR) and an LP-WUR. The network node may generally use the MR to transmit and/or receive data to UEs and/or other wireless communication devices. For example, the MR may include components of BS 110 described above with respect to FIG. 2. In some cases, the MR may be turned off or operated in a sleep state unless there are channels or signals to be transmitted or received by the network node. For example, the MR may be turned off or operated in a sleep state during cell DRX inactive times. In some aspects, the LP-WUR may serve as a simple wake-up receiver for the MR of the network node (e.g., the LP-WUR does not include a transmitter). The LP-WUR may be active and monitor for an LP-C-WUS while the MR is in the sleep state (e.g., during a cell DRX inactive time). The LP-C-WUS is a low power wake-up signal (LP-WUS) transmitted by a UE or other device to wake up the network node (e.g., the MR of the network node).

For example, reference number 710 depicts a first state associated with the MR and the LP-WUR in cases where there is no signals or channels to be transmitted or received by the MR (e.g., during a cell DRX inactive time). In such cases, the MR may be off or in a sleep state (e.g., a deep sleep state) unless there signals or channels to be transmitted or received signals or channels to be transmitted or received, and the LP-WUR may actively monitor for an LP-C-WUS (e.g., continuously or periodically in monitoring occasions that are separated in time). Reference number 720 depicts a second state associated with the MR and the LP-WUR where there are signals or channels to be transmitted or received by the MR. In such cases, the LP-WUR may receive an LP-C-WUS (e.g., from a UE) and may provide a trigger to wake up or otherwise activate the MR based on detecting the LP-C-WUS. In some examples, the LP-WUR may provide a trigger to cause the MR to remain in an active state after a C-WUS monitoring occasion for a physical layer C-WUS (e.g., a non-LP C-WUS) configured in a cell DRX configuration. Once the MR is awake or in the active state, the MR may then transmit and/or receive signals and/or channels.

The LP-WUR may be a simple radio receiver circuit designed to have a very low energy consumption. For example, the LP-WUR of the network node may be an RF envelope detector receiver (e.g., a non-coherent envelope detector), a zero intermediate frequency (IF) receiver, a low IF receiver, a super-regenerative receiver (SRR), or a discrete Fourier transform (DFT) receiver. The LP-WUR may consume very little power (e.g., a target power consumption less than 100 microwatts (μW) in the active state), which may be achieved using simple modulation schemes (e.g., on-off-keying (OOK)), a narrow bandwidth (e.g., less than 5 MHz), and/or other suitable techniques.

The LP-WUR can be used to reduce the time that the MR spends in the active state and/or may avoid unnecessarily waking the MR from the sleep state when there are no signals or channels to be transmitted or received by the MR, which tends to be costly from a power consumption perspective. For example, monitoring for an LP-C-WUS by the LP-WUR of the network node may be used in place of monitoring (e.g., by the MR) for a non-LP C-WUS (e.g., a physical layer C-WUS) during a cell DRX cycle or may allow for an increase in the time period between monitoring occasions for a non-LP C-WUS, which may reduce network power consumption. Furthermore, because the LP-WUR has a very low power consumption, the LP-WUR can be used to frequently or continuously perform LP-WUS monitoring, which may improve latency because the LP-WUR can receive the LP-C-WUS and wake up the MR during a time period between configured monitoring occasions for a non-LP C-WUS.

As indicated above, FIG. 7 is provided as an example. Other examples may differ from what is described with regard to FIG. 7.

Figure 8A:
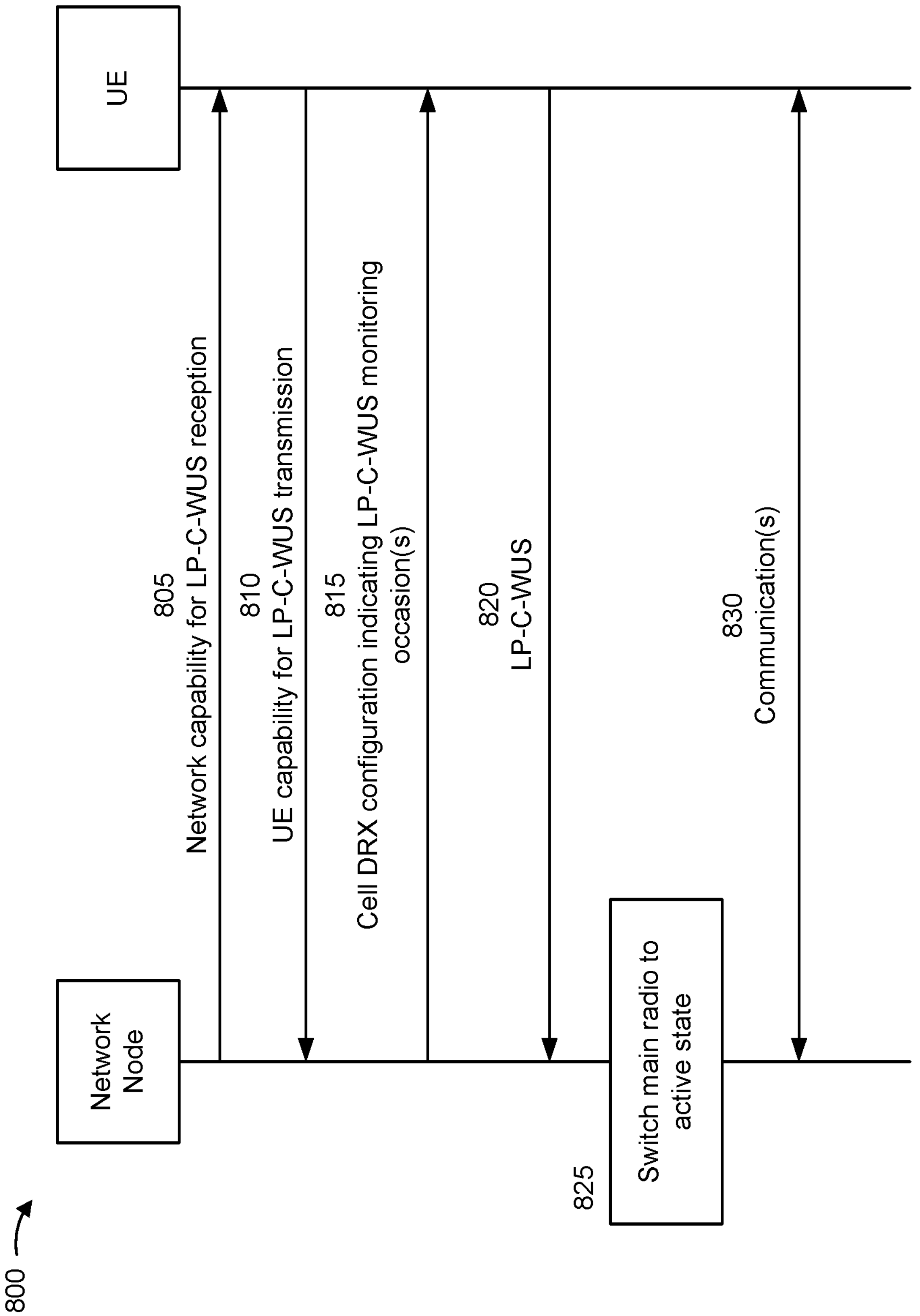
FIGS. 8A-8E are diagrams illustrating an example associated with cell DRX with a low-power cell wake-up signal (LP-C-WUS), in accordance with the present disclosure.

FIGS. 8A-8E are diagrams illustrating an example 800 associated with cell DRX with an LP-C-WUS, in accordance with the present disclosure. As shown in FIG. 8A, example 800 includes communication between a network node (e.g., BS 110 or a disaggregated base station as discussed with respect to FIG. 3) and a UE (e.g., UE 120). In some aspects, the network node and the UE may be included in a wireless network, such as wireless network 100. The network node and the UE may communicate via a wireless access link, which may include an uplink and a downlink. The network node may include an MR and an LP-WUR, as described in connection with FIG. 7.

As shown in FIG. 8A, and by reference number 805, the network node may transmit, and the UE may receive, an indication of a network capability for LP-C-WUS reception. For example, the indication of the network capability for LP-C-WUS reception may be included in an SSB, a SIB1, other SIBs (OSIBs), or layer 1 (L1), layer 2 (L2), or layer 3 (L3) signaling (e.g., in an RRC message, a MAC control element (MAC-CE), or DCI). In some aspects, indication of the network capability may indicate whether or not the network node supports LP-C-WUS reception. There may be different classes and designs of LP-C-WUS depending on the capability of the network node. In some aspects, the indication the network capability may which types or formats of LP-C-WUSs the network node supports. For example, the indication of the network capability may indicate one or more types/formats of LP-C-WUSs supported by the network node. In some aspects, the indication of the network capability may include information identifying supported waveforms and/or modulations to be used for LP-C-WUS. For example, the network capability information may indicate a class of the LP-WUR of the network node, and the class of the LP-WUR may identify waveforms and/or modulations that can be received by the LP-WUR. The LP-C-WUS may be a signal capable of being received by the LP-WUR of the network node. In some aspects, the indication of the network capability may include information that indicates which content can be included in a payload of an LP-C-WUS that is transmitted by a UE. In some aspects, indication of the network capability may indicate certain frequency bands and/or frequency ranges in which LP-C-WUS reception is supported by the network node. For example, the indication of the network capability may identify one or more frequency ranges (e.g., FR1 and/or FR2, among other examples) in which LP-C-WUS reception is supported, one or more frequency bands in which LP-C-WUS reception is supported, one or more bandwidth parts (BWPs) in which LP-C-WUS reception is supported, and/or one or more frequencies within each configured BWP or frequency band in which LP-C-WUS is supported.

In some aspects, the types or formats of LP-C-WUSs supported by the network node may include at least one of an OOK based waveform (e.g., an OFDM-based waveform, such as a CP OFDM waveform and/or a DFT-spread-OFDM (DFT-S-OFDM) waveform), an frequency-shift keying (FSK) based OFDM signal, a sequence based signal processed in the time domain (e.g., a DFT based sequence, a Zadoff sequence, a Gold sequence, an m-sequence, a pulse amplitude modulation (PAM) based sequence, or a pulse position modulation (PPM) based sequence, among other examples), a DFT based sequence processed in the frequency domain, or a PDCCH based signal. The PDCCH based LP-C-WUS may have a power consumption than other types of LP-C-WUSs described herein, but may still provide network power savings in a case in which the network node supports a sleep state that is lower than a deep sleep state (where power saving is still maintained) but allows the network node to wake up faster from processing than the deep sleep state.

As further shown in FIG. 8A, and by reference number 810, the UE may transmit, and the network node may receive, an indication of a UE capability for LP-C-WUS transmission. In some aspects, the indication of the UE capability may indicate whether or not the UE supports LP-C-WUS transmission. In some aspects, the indication of the UE capability may indicate whether the UE supports transmission of types/formats of LP-C-WUS per frequency band and/or frequency band combination, per frequency range and/or frequency range combination, and/or per component carrier (CC) and/or CC combination. The indication of the UE capability may be included in an RACH message, a response to the indication of the network capability for LP-C-WUS reception, UE assistance information (UAI), or L1, L2, or L3 signaling (e.g., in an RRC message, a MAC-CE, or UCI).

In some aspects, indication of the UE capability LP-C-WUS transmission may be based at least in part on the indication of the network capability for LP-C-WUS reception. For example, the UE may indicate support for LP-C-WUS transmission in connection with supporting at least one type/format of LP-C-WUS that is also supported by the network node. In some aspects, the UE select between support LP-C-WUS transmission and support for non-LP C-WUS transmission. A non-LP C-WUS refers to a C-WUS that is received by the MR of the network node (e.g., a C-WUS that required to MR to be in the active state to be received by the network node). For example, a physical layer C-WUS (e.g., a PRACH or SR), as described above in connection with FIG. 6, may be referred to herein as a non-LP C-WUS. In some aspects, as discussed in greater detail in connection FIG. 9, LP-C-WUS transmission may be activated or enabled in a partial coverage area or a full coverage area of a cell associated with the network node. In some examples, the UE may support LP-C-WUS transmission for better power saving (e.g., as compared to non-LP C-WUS transmission), for example, due to a simpler transmitter and/or a lower transmit power being supported in the partial coverage area, among other examples. In some other examples, such as in the full coverage area case, LP-C-WUS transmission may come at a cost of added repetition of power boosting from the UE and may therefore utilize more power to achieve the same coverage as the non-LP C-WUS. In such examples, the UE may not support LP-C-WUS transmission. In some aspects, the indication of the UE support for LP-C-WUS transmission may be dynamic, and the UE may change the indication, for example, based at least in part on a location of the UE in the cell or mobility measurements of the UE, among other examples.

As further shown in FIG. 8A, and by reference number 815, the network node may transmit, and the UE may receive, a cell DRX configuration. In some aspects, the cell DRX configuration may indicate one or more LP-C-WUS monitoring occasions in a cell DRX cycle. An LP-C-WUS monitoring occasion is a time window in which the LP-WUR of the network node monitors for an LP-C-WUS from the UE and/or other UEs in the cell. In some aspects, the one or more LP-C-WUS monitoring occasions may be scheduled when the MR of the network node is configured (e.g., in accordance with the cell DRX configuration) to be in a sleep state. That is the LP-WUR of the network node may monitor for an LP-C-WUS while the MR of the network node is in the sleep state (e.g., during a cell DRX inactive time for the MR). In some aspects, the cell DRX configuration may configure periodic LP-C-WUS monitoring occasions. In some aspects, the cell DRX configuration may configure C-WUS monitoring occasions for non-LP C-WUS monitoring (e.g., by the MR in an active state) in addition to the LP-C-WUS monitoring occasions. In some aspects, the timing for the one or more LP-C-WUS monitoring occasions may be configured based at least in part on the non-LP C-WUS monitoring occasions. For example, the one or more LP-C-WUS monitoring occasions may be scheduled between the non-LP C-WUS monitoring occasions.

Figure 8B:
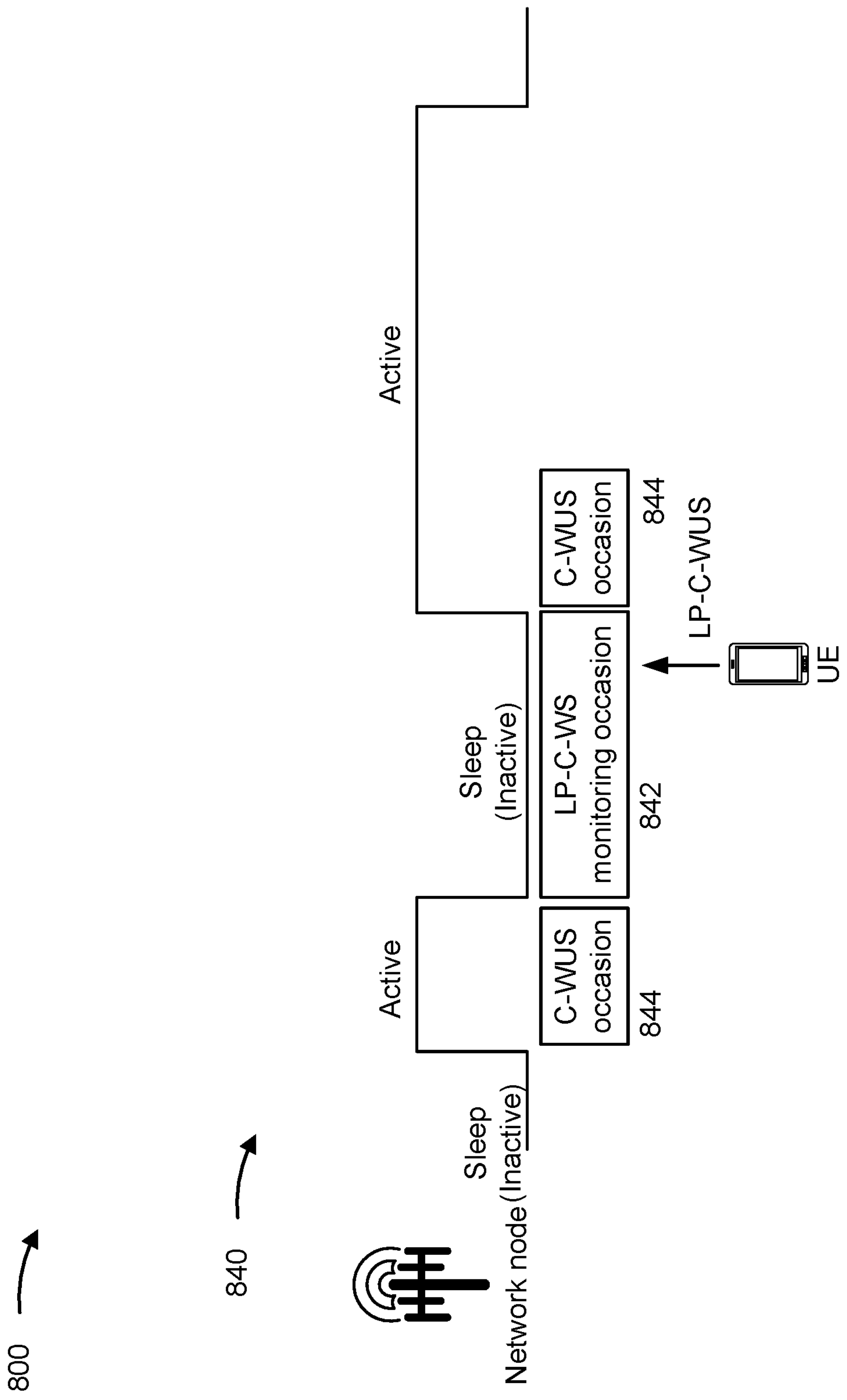

As shown in FIG. 8B, and by reference number 840, in some aspects, the cell DRX configuration may configure an LP-C-WUS monitoring occasion 842 that is a continuous LP-C-WUS monitoring time window between non-LP C-WUS monitoring occasions 844. The cell DRX configuration may configure a cell DRX cycle with active times (cell DRX on durations) and inactive times (cell DRX off durations) that are followed by the MR of the network node. That is, the MR of the network node may enter the sleep state during the cell DRX inactive times, and the MR of the network node may switch to the active state during the cell DRX active times. For example, the MR of the network node may switch to the active state to monitor the non-LP C-WUS monitoring occasions 844 and may enter the sleep state after a non-LP C-WUS monitoring occasion if no C-WUS is detected. The LP-WUR may monitor for an LP-C-WUS during the LP-C-WUS monitoring 842, while the MR is in the sleep state. In the example of FIG. 8B, in which the LP-C-WUS monitoring occasion 842 is a continuous LP-C-WUS monitoring time window between the non-LP C-WUS monitoring occasions 844, the LP-WUR continuously monitors for an LP-C-WUS while the MR is in the sleep state.

A UE that supports LP-C-WUS transmission may transmit an LP-C-WUS (e.g., with a compatible format based on the indication of the network capability) during the LP-C-WUS monitoring occasion 842 (e.g., any time the MR is in the sleep state in the example of FIG. 8B). The LP-WUR may trigger an active time duration for the MR of the network node in connection with the LP-WUR receiving/detecting an LP-C-WUS during the LP-C-WUS monitoring occasion 842. In some aspects, the MR may enter the active state at the next scheduled active time after the LP-C-WUS monitoring occasion 842 in which the LP-C-WUS is detected by the LP-WUR (e.g., at the start time of the next non-LP C-WUS monitoring occasion 844), and the LP-WUR may trigger the MR to extend the active time in connection with the LP-WUR detecting the LP-C-WUS. In some other aspects, the LP-WUR, in connection with receiving the LP-C-WUS, may trigger the MR to activate the MR from the sleep state at a time that does not correspond to a configured non-LP C-WUS monitoring occasion, such as at a time offset from detecting/receiving the LP-C-WUS or a configured active time duration based on the LP-C-WUS monitoring occasion 842.

Figure 8C:
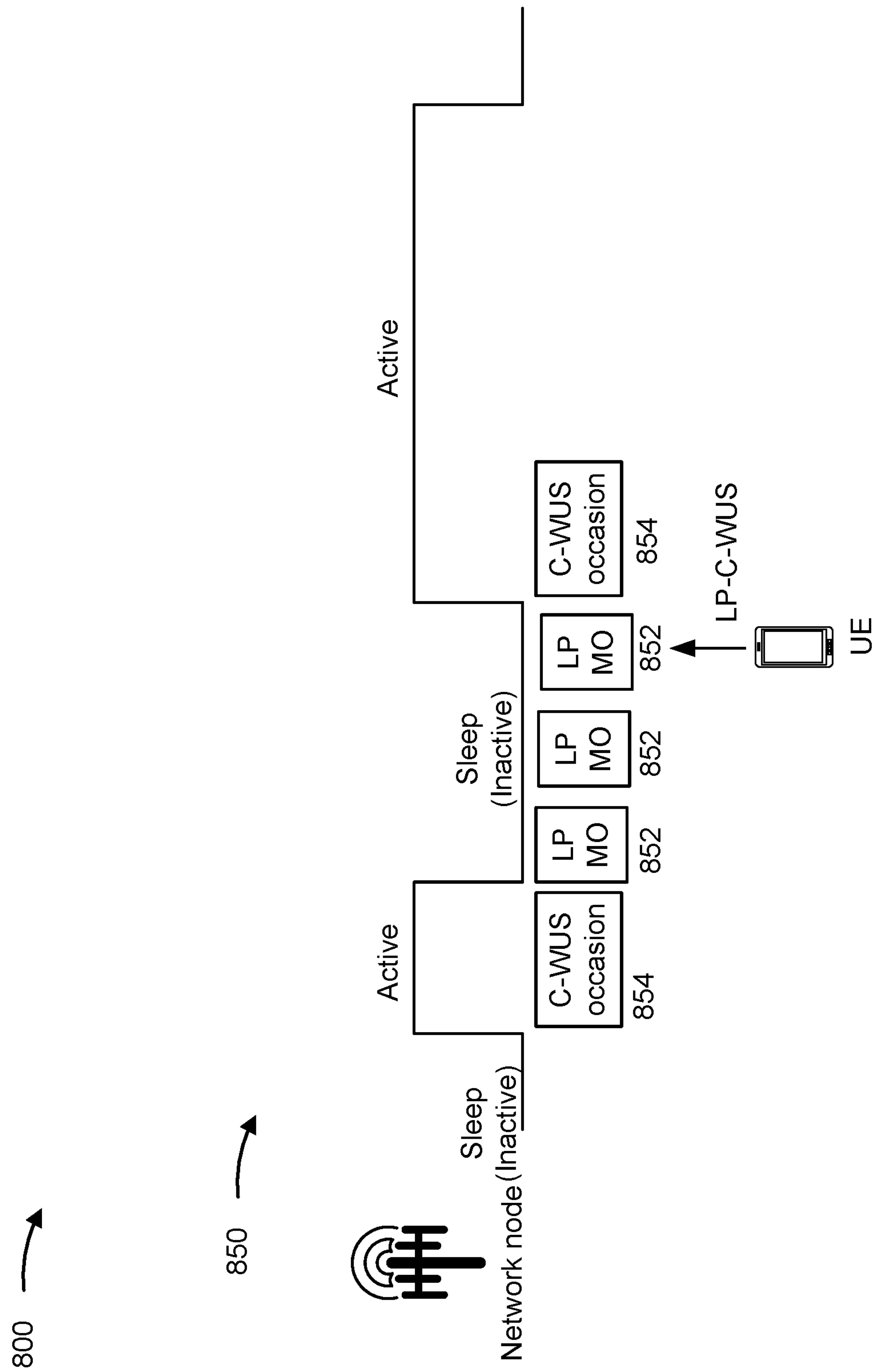

As shown in FIG. 8C, and by reference number 850, in some aspects, the cell DRX configuration may configure multiple LP-C-WUS monitoring occasions 852 between non-LP C-WUS monitoring occasions 854. In this case, instead of continuously monitoring for an LP-C-WUS while the MR is in the sleep state, the LP-C-WUS may monitor for an LP-C-WUS during configured monitoring occasions 854, which may be separated by a certain time duration.

In some aspects, the LP-WUR of the network node may switch off or to a sleep state between the scheduled LP-C-WUS monitoring occasions 852 (and/or when the MR is in the active state), and the LP-WUR of the network node may switch on or to an active state during the scheduled LP-C-WUS monitoring occasions 852. For example, the LP-WUR may follow a DRX cycle configured for the LP-WUR, and the LP-C-WUS monitoring occasions may correspond to active times in the DRX cycle for the LP-WUR. In some aspects, the cell DRX configuration transmitted to the UE may include a first cell DRX configuration associated with the LP-WUR of the network node (e.g., that indicates a configuration of a first cell DRX cycle for the LP-WUR) and a second cell DRX configuration associated with the MR of the network node (e.g., the indicates a configuration of a second cell DRX cycle for the MR). The first cell DRX cycle may include the LP-C-WUS monitoring occasions 852, and the second cell DRX cycle may include the non-LP C-WUS monitoring occasions 854. The network node and the UE may follow the second cell DRX configuration (e.g., the cell DRX configuration for the MR) for transmitting and/or receiving downlink and/or uplink communications involving the MR (e.g., communications other than the LP-C-WUS). In some aspects, the first cell DRX cycle and the second cell DRX cycle may be aligned such that the active time durations for the LP-WUR (e.g., corresponding to the LP-C-WUS monitoring occasions) are configured to occur when the MR is in the sleep state, and the LP-WUR is configured to be in the sleep state during the active time durations configured for the MR. In some other aspects, the first cell DRX cycle (e.g., the cell DRX cycle of the LP-WUR) may be independent of the second cell DRX cycle (e.g., the cell DRX cycle of the MR).

A UE that supports LP-C-WUS transmission may transmit an LP-C-WUS during any of the LP-C-WUS monitoring occasions 852. The LP-WUR may trigger an active time duration for the MR of the network node in connection with the LP-WUR receiving/detecting an LP-C-WUS during an LP-C-WUS monitoring occasion 852. In some aspects, the MR may enter the active state at the next scheduled active time after the LP-C-WUS monitoring occasion 852 in which the LP-C-WUS is detected by the LP-WUR (e.g., at the start time of the next non-LP C-WUS monitoring occasion 854), and the LP-WUR may trigger the MR to extend the active time in connection with the LP-WUR detecting the LP-C-WUS. In some other aspects, the LP-WUR, in connection with receiving the LP-C-WUS, may trigger the MR to activate the MR from the sleep state at a time that does not correspond to a configured non-LP C-WUS monitoring occasion, such as at a time offset from detecting/receiving the LP-C-WUS or a configured active time duration based on the LP-C-WUS monitoring occasion 842.

Figure 8D:
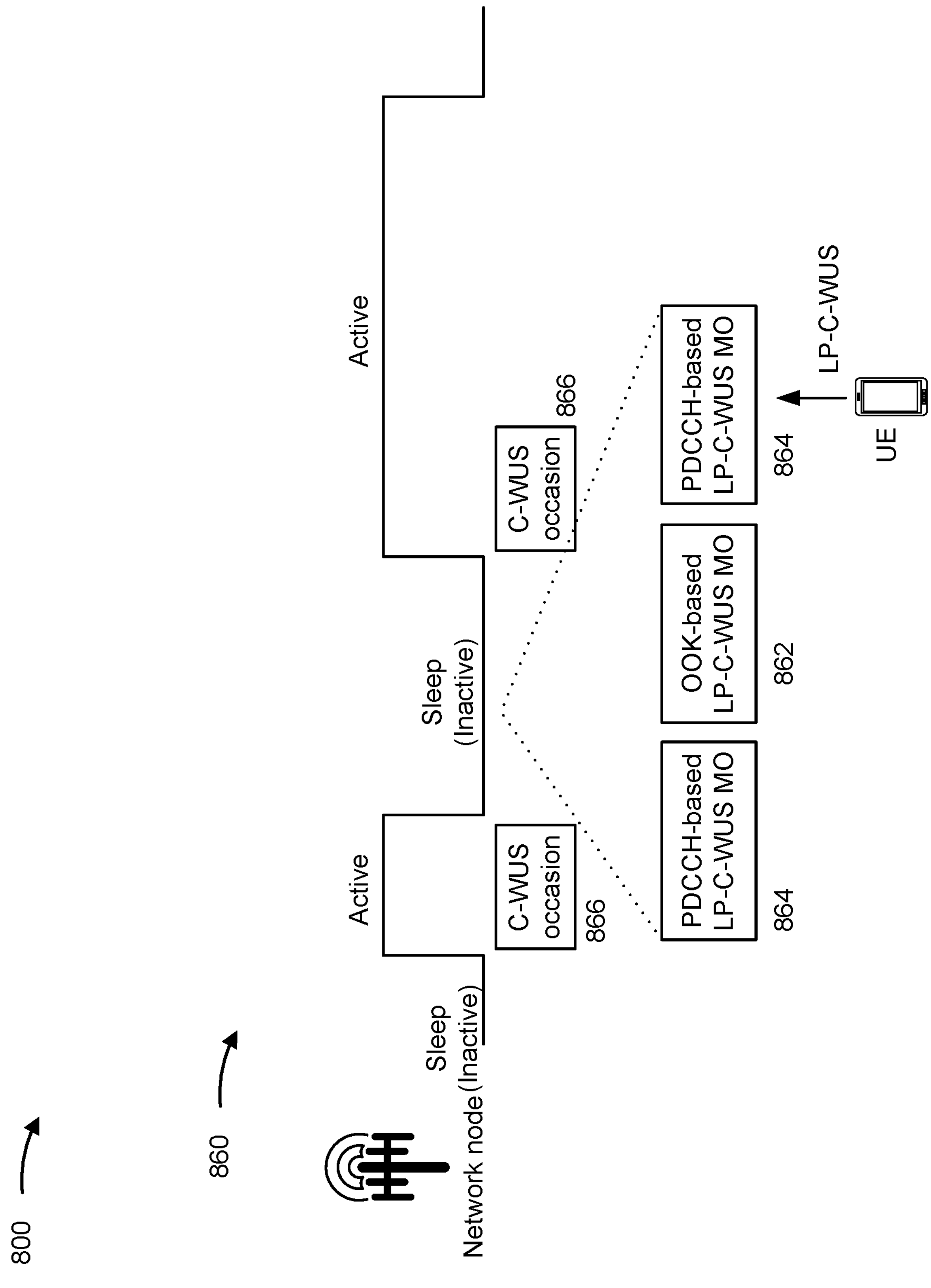

As shown in FIG. 8D, and by reference number 860, in some aspects, the cell DRX configuration may configure different LP-C-WUS monitoring occasions for different types of LP-C-WUSs supported by the network node. The LP-WUR of the network node may support various signals, and the LP-C-WUS monitoring occasions may be configured such that the LP-WUR supports different types of signals at different times. For example, the configured LP-C-WUS monitoring occasions in the cell DRX cycle may include a first LP-C-WUS monitoring occasion associated with a first type of LP-C-WUS and a second LP-C-WUS monitoring occasion associated with a second type of LP-C-WUS. As shown in FIG. 8D, the configured LP-C-WUS monitoring occasions (e.g., in each cell DRX cycle) may include an LP-C-WUS monitoring occasion 862 associated with OOK-based LP-C-WUS and LP-C-WUS monitoring occasions 864 associated with a PDCCH-based LP-C-WUS. The LP-WUR of the network node may support an OOK-based LP-C-WUS during the OOK-based LP-C-WUS monitoring occasion 864, and the LP-WUR may a PDCCH-based LP-C-WUS during the PDCCH-based LP-C-WUS monitoring occasions 864. That is, the LP-WUR may monitor for the OOK-based LP-C-WUS during the OOK-based LP-C-WUS monitoring occasion and monitor for the PDCCH-based LP-C-WUS during the PDCCH-based LP-C-WUS monitoring occasion. In some aspects, there may be a time gap between different types of LP-C-WUS monitoring occasions for the LP-WUR to switch (e.g., transition time and energy) between two modes to receive the different types of signals. This time gap may be configured and reported to UEs (e.g., in the cell DRX configuration) so that the UEs can then use the proper LP-C-WUS format at the proper time. In some aspects, the different types of monitoring occasions may be configured, per cell DRX cycle, to occur in the inactive time for the MR. For example, as shown in FIG. 8D, the OOK-based LP-C-WUS monitoring occasion 864 and the PDCCH-based LP-C-WUS monitoring occasions 864 may be configured to occur during the inactive time for the MR between non-LP C-WUS monitoring occasions 866.

A UE that supports the type of LP-C-WUS associated with an LP-C-WUS monitoring occasion may transmit that type of LP-C-WUS during that LP-C-WUS monitoring occasion. For example, a UE may transmit an OOK-based LP-C-WUS during the OOK-based LP-C-WUS monitoring occasion 862. A UE may transmit a PDCCH-based LP-C-WUS during the PDCCH-based LP-C-WUS monitoring occasions 864. The LP-WUR may trigger an active time duration for the MR of the network node in connection with the LP-WUR receiving/detecting an OOK-based LP-C-WUS during the OOK-based LP-C-WUS monitoring occasion 862 or a PDCCH-based LP-C-WUS during a PDCCH-based LP-C-WUS monitoring occasion 864. In some aspects, the MR may enter the active state at the next scheduled active time after the LP-C-WUS is detected by the LP-WUR (e.g., at the start time of the next non-LP C-WUS monitoring occasion 866), and the LP-WUR may trigger the MR to extend the active time in connection with the LP-WUR detecting the LP-C-WUS. In some other aspects, the LP-WUR, in connection with receiving the LP-C-WUS, may trigger the MR to activate the MR from the sleep state at a time that does not correspond to a configured non-LP C-WUS monitoring occasion, such as at an time offset from detecting/receiving the LP-C-WUS or a configured active time duration based on the LP-C-WUS monitoring occasion in which the LP-C-WUS is received.

Figure 8E:
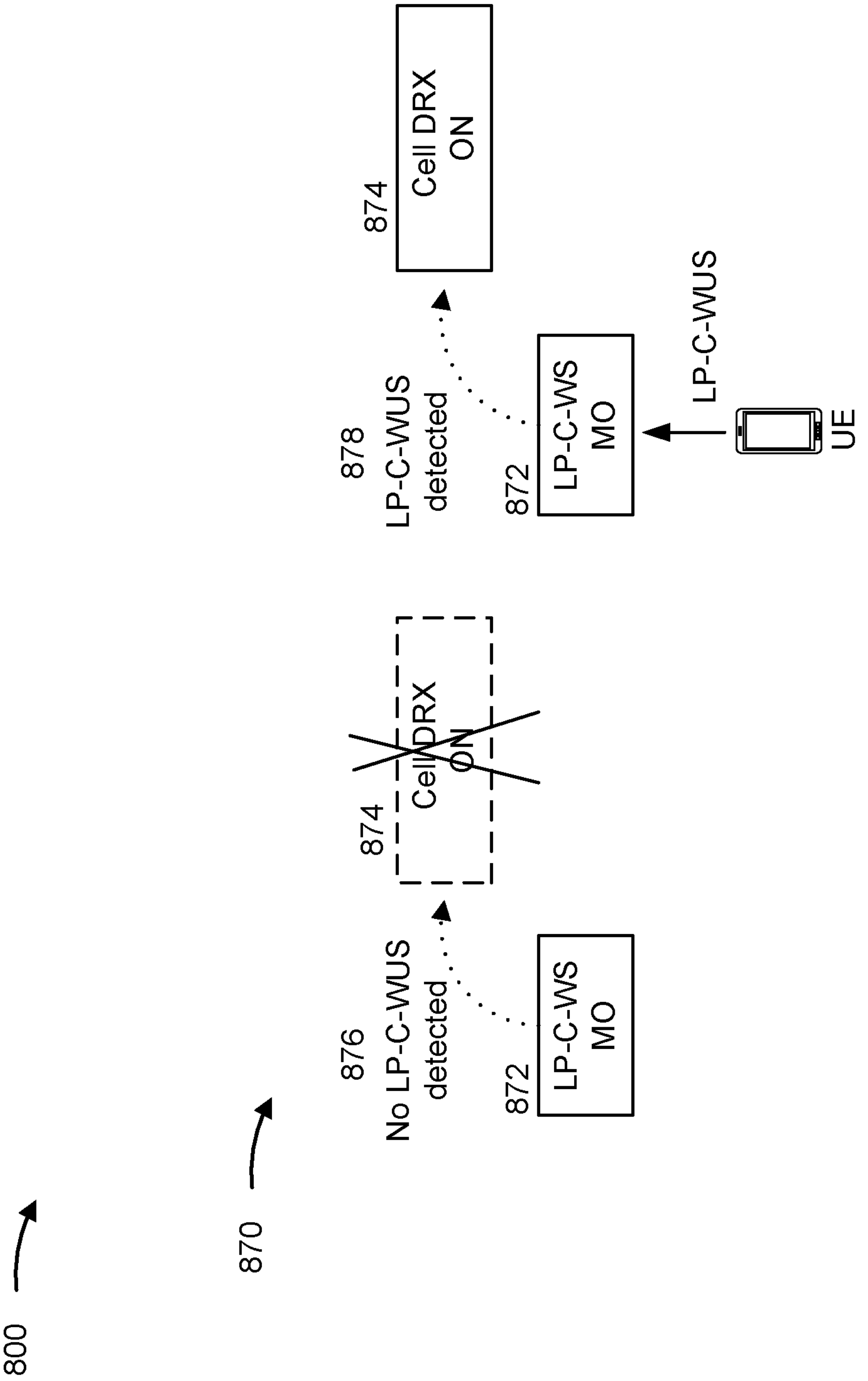

As shown in FIG. 8E, and by reference number 870, in some aspects, configured LP-C-WUS monitoring occasions 872 may be associated with configured cell DRX on time windows 874. Each configured cell DRX on time window 874 is potential time window for a cell DRX on duration for the MR that is conditional on the LP-WUR detecting an LP-C-WUS in an LP-C-WUS monitoring occasion 872 that is associated with that cell DRX on time window 874. In some examples, each LP-C-WUS monitoring occasion 872 may be associated with a respective DRX on time window 874. In other examples, a cell DRX on time window 874 may be associated with multiple LP-C-WUS monitoring occasions 872. In some aspects, the cell DRX on time windows 874 associated with the configured LP-C-WUS monitoring occasions 872 may be independent of any configured cell DRX on durations (e.g., active time durations) corresponding to non-LP C-WUS monitoring occasions in the cell DRX cycle. In some other aspects, a configured start time for a cell DRX on time window 874 associated with at least one configured LP-C-WUS monitoring occasion may be aligned with a start time of a non-LP C-WUS monitoring occasion.

The LP-WUR of the network node may monitor for an LP-C-WUS during the LP-C-WUS monitoring occasions 872. As shown by reference number 876, if the LP-WUR does not detect an LP-C-WUS in a LP-C-WUS monitoring occasion 872, the MR is not activated (e.g., the MR does not switch to the active state) in the cell DRX on time window 874 associated with that LP-C-WUS monitoring occasion 872. As shown by reference number 878, if the LP-WUR detects an LP-C-WUS in an LP-C-WUS monitoring occasion 872, the LP-WUR may trigger the MR such that the MR is switched to the active state for the cell DRX on time window 874 associated with that LP-C-WUS monitoring occasion 872. In this case, the cell DRX on time window 874 defines an active time (e.g., a cell DRX on duration) for the MR of the network node.

In some aspects, the UE may indicate, in the contents of the payload of the LP-C-WUS, an adjustment to the configured cell DRX on time window 874 associated with a monitoring occasion 872. For example, the LP-C-WUS payload may include an indication of an offset (e.g., a delta value) between the start time of the configured cell DRX on time window 874 and a requested start time for the active time for the MR and/or an offset (e.g., a delta value) between the duration of the configured cell DRX on time window 874 and a requested duration for the active time for the MR.

Returning to FIG. 8A, as shown by reference number 820, the UE may transmit an LP-C-WUS in an LP-C-WUS monitoring occasion. The network node may receive the LP-C-WUS in the LP-C-WUS monitoring occasion. For example, the LP-WUR of the network node may monitor the configured one or more LP-C-WUS monitoring occasions while the MR is in the sleep state. The LP-C-WUS of the network node may receive/detect the LP-C-WUS transmitted by the UE in the LP-C-WUS monitoring occasion. The type of signal used for the LP-C-WUS by the UE may be based at least in part on the indication of the network capability for LP-C-WUS reception. For example, the UE may transmit a type of LP-C-WUS supported by the network node.

In some aspects, the UE may transmit the LP-C-WUS based at least in part on receiving, from the network node, an indication that enables LP-C-WUS transmission. For example, the network node may indicate whether the network node will only support one of LP-C-WUS transmission or non-LP C-WUS transmission or support both of LP-C-WUS transmission and non-LP C-WUS transmission at a given time. In a case in which the network node only supports one of LP-C-WUS transmission or non-LP C-WUS transmission at a time, the network node may transmit an indication that enables or disables LP-C-WUS transmission or non-LP C-WUS transmission for UEs in the cell. For example, this indication may be included in the MIB, SIB1, OSIB, a RACH message, or L1, L2, or L3 signaling (e.g., an RRC message, a MAC-CE, or DCI). In such examples, the UE may transmit the LP-C-WUS in connection with LP-C-WUS transmission being enabled. Alternatively, the UE may transmit a non-LP C-WUS in connection with non-LP C-WUS transmission being enabled and/or LP-C-WUS transmission being disabled.

In some aspects, in a case in which the UE supports both LP-C-WUS transmission and non-LP C-WUS transmission and the network node supports the use of both LP-C-WUS transmission and non-LP C-WUS transmission, the UE may select whether to transmit the LP-C-WUS in an LP-C-WUS monitoring occasion or transmit a non-LP C-WUS in a non-LP C-WUS monitoring occasion. In some aspects, the UE may select whether to transmit the LP-C-WUS (e.g., communicate with the LP-WUR of the network node) or transmit the non-LP C-WUS (e.g., communicate with the MR of the network node) based at least in part on one or more traffic characteristics of traffic associated with the UE (e.g., uplink traffic to be transmitted by the UE and/or downlink traffic to be received by the UE) and/or an RRC mode (e.g., connected, idle or inactive) of the UE. For example, the one or more traffic characteristics may include L1/L2 priority, QoS, and/or a delay parameter (e.g., remaining packet delay budget (PDB)), among other examples.

In some aspects, the network node may transmit, and the UE may receive a configuration of transmit parameters for the LP-C-WUS. The UE may transmit the LP-C-WUS using the configured transmit parameters received from the network node. In some aspects, the configuration of the transmit parameters may include a configuration of first transmit parameters for the LP-C-WUS and second transmit parameters for the non-LP C-WUS. In this case, the UE may use the first transmit parameters to transmit the LP-C-WUS or the second transmit parameters to transmit the non-LP C-WUS, in connection with the selection of whether to transmit the LP-C-WUS or the non-LP C-WUS. In some examples, the configuration of the transmit parameters may indicate different transmit parameters for different LP-C-WUSs supported by the network node. In some aspects, the transmit parameters (for each LP-C-WUS type and/or for the non-LP C-WUS) may indicate transmit power, guardbands, and/or transmit beams, among other examples, to be used by the UE to transmit the LP-C-WUS (or the non-LP C-WUS). In some aspects, the configuration of the transmit parameters may be transmitted using L1, L2, or L3 signaling so that the configuration can efficiently capture environment and/or channel changes over time. In some aspects, the UE may add a guard band around the LP-C-WUS to reduce adjacent channel interference (ACI) and/or co-channel interference. For example, the guardband may be indicated in the configuration of the transmit parameters for the LP-C-WUS.

In some aspects, the UE may transmit in time resources for dedicated time resources configured for the type of signal used for the LP-C-WUS. For example, the LP-C-WUS monitoring occasion may include dedicated time resources configured for transmission of the LP-C-WUS. Additionally, or alternatively, the UE may transmit the LP-C-WUS in a dedicated frequency band configured for transmission of the LP-C-WUS. In some cases, if the LP-C-WUS is not OFDM based, there may be a coexistence problem between OFDM based signals and the LP-C-WUS signals (e.g., because OFDM signal orthogonality may be damaged). In this case, the network node may configure dedicated time resources for the signals used for the LP-C-WUS (e.g., that are not used for the OFDM based signals) and/or a dedicated frequency band for the LP-C-WUS. The configuration of the dedicated time resources and/or the dedicated frequency band for the LP-C-WUS may be indicated in the indication of the network capability for LP-C-WUS reception, the cell DRX configuration, and/or some other configuration information transmitted from the network node to the UE.

The LP-WUR of the network node may have a low clock accuracy. In some aspects, the network node may perform synchronization of the LP-WUR using synchronization signals received at the network node. For example, the synchronization signals may be transmitted by the UE or by another network node. The synchronization signals may be periodic synchronization signals, a preamble signal transmitted (e.g., by the UE) with the LP-C-WUS, or a combination thereof. The methods of synchronization may be configured semi-statically or dynamically using L1, L2, or L3 indications. The transmission of the synchronization signals by the UE may be subject to UE capability. The synchronization signals (e.g., transmitted by the UE or another network node) for synchronization of the LP-WUR may be received by the LP-WUR, or the MR of the network node may wake up occasionally (e.g., periodically) to receive the synchronization signals. In some aspects, the LP-WUR of the network node may support a different format/type of signal for synchronization from the format/type of signal supported for the LP-C-WUS. For example, the low power synchronization signal and/or the preamble signal used for synchronization of the LP-WUR may be OOK or FSK waveforms or reference signals (e.g., SRS, tracking reference signal (TRS), CSI-RS, or SSB). In some aspects, times or occasions for the UE to transmit low power synchronization signals (e.g., periodic or aperiodic synchronization signals) to be used for synchronization of the LP-WUR may be configured/indicated in the MIB, SIB1, RACH messages, OSIBs, via L1, L2, or L3 indications from the network node to the UE. For example, the L1, L2, or L3 indications from the network node to the UE may be based on preferences and/or capabilities indicated by the UE via L1, L2, or L3 signaling (e.g., in UAI) or multiplexed with L1, L2, or L3 signaling (e.g., multiplexed with an SR, a BSR, channel state information (CSI), a HARQ-ACK, or a PHR, among other examples).

In some aspects, the transmit beam used by the UE to transmit the LP-C-WUS may be based on a quasi co-location (QCL) relation between the LP-C-WUS and a non-LP C-WUS. For example, the QCL relation between the LP-C-WUS and a non-LP C-WUS may be configured by the network node (e.g., in the configuration of the transmit parameters or other configuration information) or may be defined (e.g., in a wireless communication standard). In some aspects, the LP-C-WUS may be QCLed with an SSB, an SRS, another LP-C-WUS, or a synchronization signal for synchronization of the LP-WUR of the network node.

The LP-C-WUS may be of low rate and/or low payload size in order to achieve hood reliability, for example similar to that of PUCCH coverage. Accordingly, the LP-C-WUS may include relatively few bits per LP-C-WUS packet. The network node may define/configure different formats for the LP-C-WUS that include different indications in the bits/payload of the LP-C-WUS. In some aspects, the bits/payload of the LP-C-WUS may indicate at least one of: a wake-up indication; a requested duration for an active time for the network node (e.g., a delta value with respect to a configured duration or an explicit indication of the requested duration); a requested start time for the active time for the network node (e.g., an offset from the transmission of the LP-C-WUS, a delta value with respect to a configured start time, or an explicit indication of the requested start time); an SSB request; a SIB1 request; a search space set group (SSSG) configuration index to be used by the UE for PDCCH monitoring; an energy request for wireless charging by the UE (e.g., in a case in which the UE is a wireless charging device and the network node supports at least on wireless charging technology, such as laser or RF wireless charging); an indication of traffic (e.g., uplink traffic) to be transmitted by the UE; a priority or QoS of the traffic to be transmitted by the UE; a type of traffic to be transmitted by the UE; a capability of the UE (e.g., if the UE changes capability, such as moving to or from an enhanced reduced capability (eRedCap) UE capability or another capability); an uplink BSR; or a maximum size of a downlink BSR supported by the UE in a subsequent time period. In some examples, the start time and/or the duration of the active node indicated in the payload of the LP-C-WUS may indicate a start time and/or a duration of a desired active time for the MR of the network node that is determined by the UE based at least in part on jitter and/or traffic statistics.

As further shown in FIG. 8A, and by reference number 825, the network node may switch the MR to the active state based at least in part on receiving the LP-C-WUS in the LP-C-WUS monitoring occasion. In some aspects, the LP-WUR of the network node may receive the LP-C-WUS in the LP-C-WUS monitoring occasion, and the LP-WUR may provide a trigger to wake up or otherwise activate the MR of the network node based on detecting the LP-C-WUS.

As further shown in FIG. 8A, and by reference number 830, the network node may communicate with the UE using the MR of the network node while the MR is in the active mode. In some aspects, the network node may communicate with the UE using the MR based at least in part on an indication included in the payload of the LP-C-WUS, such as a request for transmission of a downlink channel or signal by the network node or an indication of uplink traffic to be transmitted by the UE.

As indicated above, FIGS. 8A-8E are provided as an example. Other examples may differ from what is described with respect to FIGS. 8A-8E.

Figure 9:
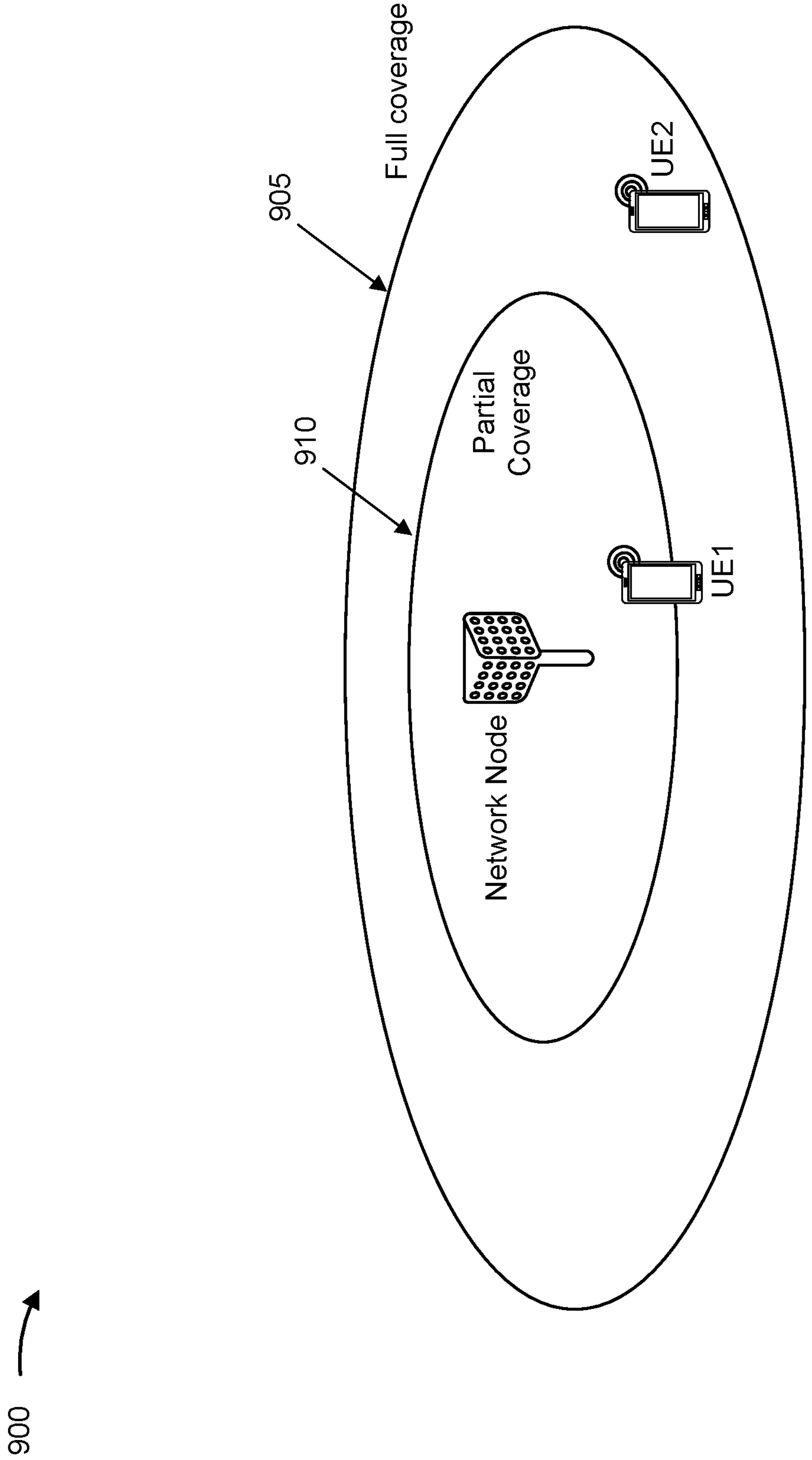
FIG. 9 is a diagram illustrating an example associated with coverage for LP-C-WUS transmission in a cell, in accordance with the present disclosure.

FIG. 9 is a diagram illustrating an example 900 associated with coverage for LP-C-WUS transmission in a cell, in accordance with the present disclosure. As shown in FIG. 9, example 900 includes a network node (e.g., BS 110, or a disaggregated base station as discussed with respect to FIG. 3), a first UE (UE1) (e.g., UE 120), and a second UE (UE2) (e.g., UE 120).

As shown in FIG. 9, in some aspects, LP-C-WUS transmission (e.g., as discussed above with respect to FIGS. 8A-8E) may have full coverage in a cell associated with the network node. In this case, LP-C-WUS transmission may be enabled for UEs in a full coverage area 905 of the cell. For example, the full coverage area 905 may be similar to a coverage area for PUCCH coverage or any other NR coverage (e.g., as defined in a wireless communication standard). In some other aspects, LP-C-WUS transmission may have partial coverage in the cell associated with the network node. In this case, the LP-C-WUS transmission may be enabled for UEs in a partial coverage area 910 of the cell. There may be a mismatch between the partial coverage area 910, in which LP-C-WUS is covered, and the full coverage area 905 for PUCCH and/or other NR overage in the cell. For example, the partial coverage area 910 may be a first coverage area, the full coverage area 905 may be a second coverage area, and the first coverage area (e.g., the partial coverage area 910) may be within the second coverage area (e.g., the full coverage area 905) and smaller than the second coverage area (e.g., the full coverage area 905).

In some aspects, LP-C-WUS transmission with partial coverage may be associated/configured with different transmit parameters (e.g., power control and repetition parameters) from LP-C-WUS transmission with full coverage. For example, the UE may transmit the LP-C-WUS using a first set of transmit parameters (e.g., configured by the network node) in connection with LP-C-WUS transmission being enabled in the partial coverage area 910, or using a second set of transmit parameters (e.g., configured by the network node) in connection with LP-C-WUS transmission being enabled in the full coverage area 905.

In some aspects, in a case in which LP-C-WUS transmission has partial coverage in the cell, LP-C-WUS transmission may be enabled for UEs in the partial coverage area 910 and non-LP C-WUS transmission may be enabled for UEs in the full coverage area 905 and outside of the partial coverage area 910. A UE in the partial coverage area 910 (e.g., a near cell UE) may transmit an LP-C-WUS. For example, UE1 may transmit an LP-C-WUS in an LP-C-WUS monitoring occasion in connection with being within the partial coverage area 910. A UE outside of the partial coverage area 910 and within the full coverage area 905 (e.g., a far cell UE) may transmit a non-LP C-WUS. For example, UE2 may transmit a non-LP C-WUS in connection with being outside of the partial coverage area 910 and within the full coverage area 905.

In some aspects, in a case in which LP-C-WUS transmission has partial coverage, a UE may select whether to transmit an LP-C-WUS or to transmit a non-LP C-WUS based at least in part on one or more UE measurements, such as a distance measurement, a pathloss measurement, a CSI measurement, a channel metric measurement, a mobility measurement, and/or a position measurement, and/or UE knowledge of a relative position of the UE with respect to the network node. In this case, the UE may switch between LP-C-WUS transmission and non-LP C-WUS transmission based at least in part on the UE position and/or measurements performed by the UE. In some other aspects, in a case in which LP-C-WUS has partial coverage, the network node may transmit, and a UE may receive, an indication configuring LP-C-WUS transmission or non-LP C-WUS transmission for the UE based at least in part on network measurements (e.g., performed by the network node). For example, the network node may transmit the indication to the UE using L1, L2, or L3 signaling. In this case, the network node may indicate to the UE when to switch between LP-C-WUS transmission and non-LP C-WUS transmission.

As indicated above, FIG. 9 is provided as an example. Other examples may differ from what is described with respect to FIG. 9.

Figure 10:
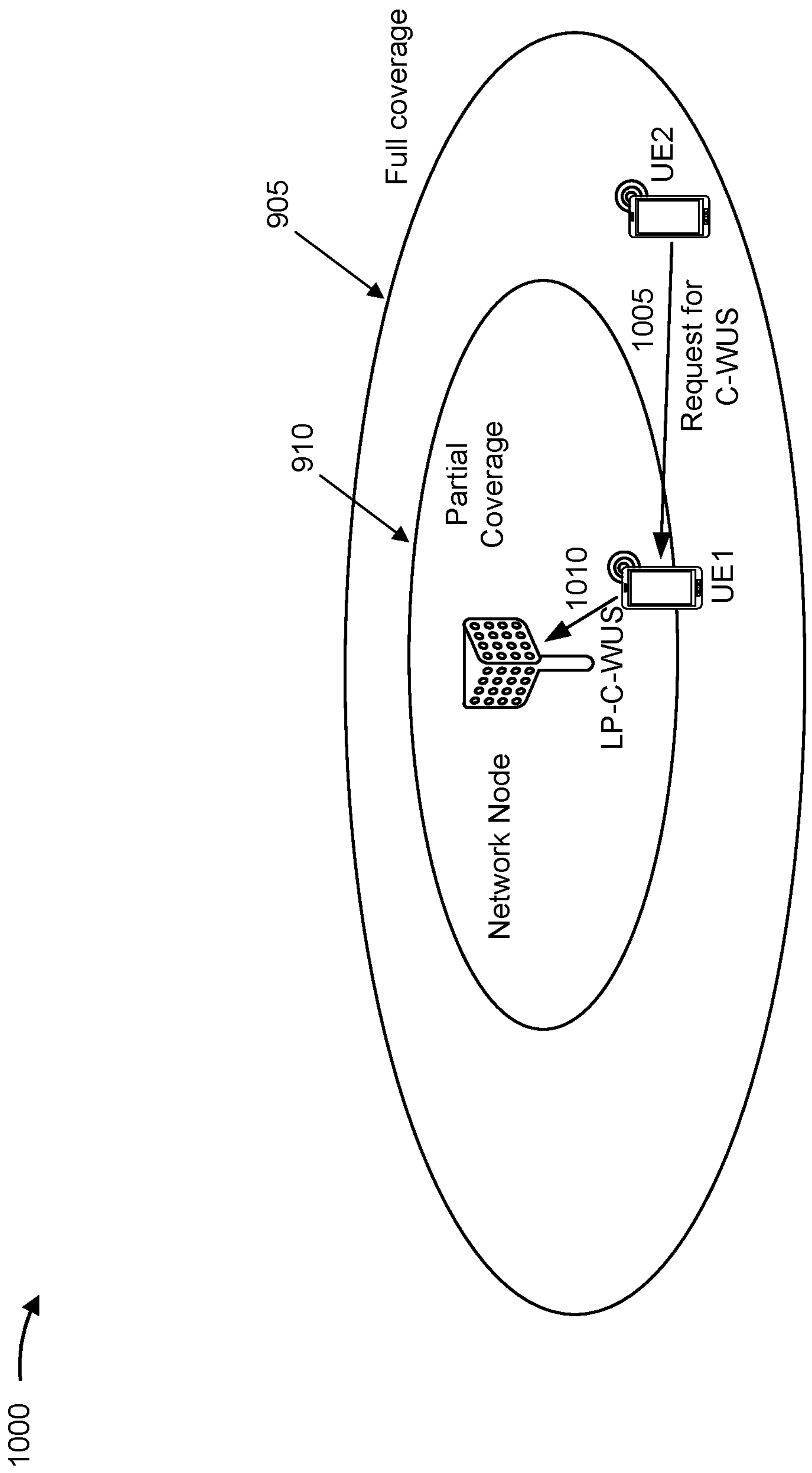
FIG. 10 is a diagram illustrating an example associated with cell wake-up signal (C-WUS) transmission assistance, in accordance with the present disclosure.

FIG. 10 is a diagram illustrating an example 1000 associated with C-WUS transmission assistance, in accordance with the present disclosure. As shown in FIG. 10, example 1000 includes a network node (e.g., BS 110, or a disaggregated base station as discussed with respect to FIG. 3), a first UE (UE1) (e.g., UE 120), and a second UE (UE2) (e.g., UE 120).

As shown in FIG. 10, in some aspects, an assisting device, such as a UE (e.g., UE1) or another network device, may assist a UE (e.g., UE2) with transmitting an LP-C-WUS (or non-LP C-WUS) to wake up the network node (e.g., the MR of the network node) from a sleep state. For example, in a case in which LP-C-WUS transmission has partial coverage in a cell associated with the network node, a far cell UE (e.g., a UE outside the partial coverage area 910 and with the full coverage area 905) may request that an assistance device (e.g., a near cell UE or another network device) transmit a C-WUS (e.g., an LP-C-WUS or a non-LP C-WUS) on behalf of the far cell UE to wake up the network node. The assisting device may transmit an LP-C-WUS or a non-LP C-WUS on behalf of the far cell UE based at least in part on receiving the request from the far cell UE. For example, if the assisting device supports LP-C-WUS transmission and is in the near cell (e.g., in the partial coverage area 910 for LP-C-WUS transmission), the assisting device may transmit an LP-C-WUS on behalf of the far cell UE. Alternatively, if the assisting device does not support LP-C-WUS transmission or the assisting device is outside of the partial coverage area 910 for LP-C-WUS transmission (e.g., the assisting device may be a far cell device, but still closer to the network node than the far cell UE requesting assistance), the assisting device may transmit a non-LP C-WUS.

As shown in FIG. 10, and by reference number 1005, UE2 may transmit, and UE1 may receive, a request to transmit a C-WUS (e.g., an LP-C-WUS) on behalf of UE2. For example, UE2 may be a far cell UE outside of the partial coverage area 910 for LP-C-WUS transmission (and within the full coverage area 905 of the cell). UE1 may be a near cell UE within the partial coverage area 910 for LP-C-WUS transmission, and UE1 may support LP-C-WUS transmission. As shown by reference number 1010, UE1 may transmit an LP-C-WUS based at least in part on receiving the request from UE2. That is, based at least in part on receiving the request from UE2, UE1 may transmit an LP-C-WUS on behalf of UE2.

As indicated above, FIG. 10 is provided as an example. Other examples may differ from what is described with respect to FIG. 10.

Figure 11:
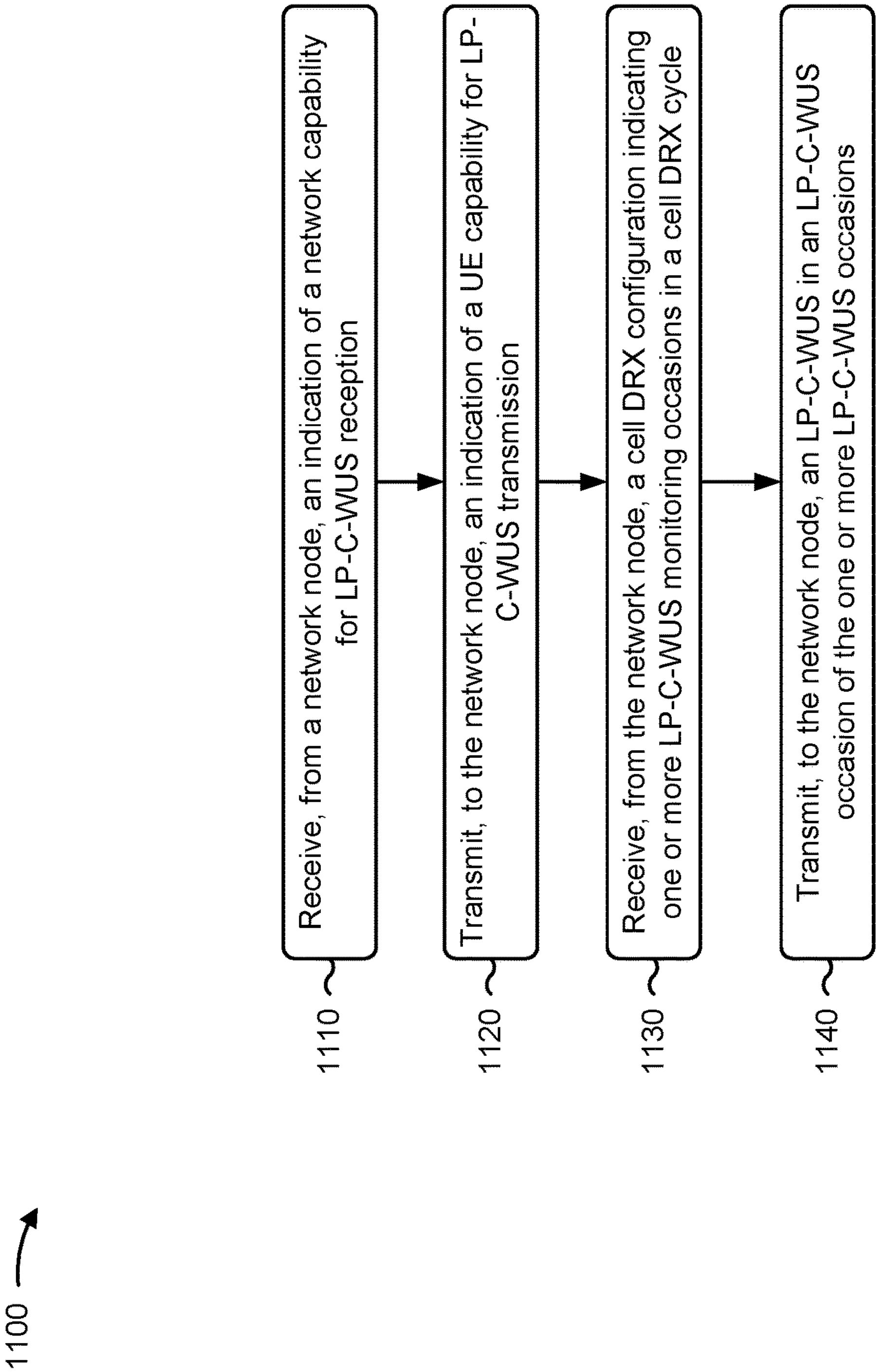
FIG. 11 shows a method for wireless communications by a UE, in accordance with the present disclosure.

FIG. 11 shows a method 1100 for wireless communications by a UE, such as UE 120.

Method 1100 begins at 1110 with receiving, from a network node, an indication of a network capability for LP-C-WUS reception.

Method 1100 then proceeds to step 1120 with transmitting, to the network node, an indication of a UE capability for LP-C-WUS transmission.

Method 1100 then proceeds to step 1130 with receiving, from the network node, a cell DRX configuration indicating one or more LP-C-WUS monitoring occasions in a cell DRX cycle.

Method 1100 then proceeds to step 1140 with transmitting, to the network node, an LP-C-WUS in an LP-C-WUS occasion of the one or more LP-C-WUS occasions.

In one aspect, the indication of the network capability for LP-C-WUS reception is included in an SSB, a SIB1, another SIB, an RRC message, a MAC-CE, or DCI.

In one aspect, the indication of the network capability for LP-C-WUS reception indicates whether the network node supports LP-C-WUS reception.

In one aspect, the indication of the network capability for LP-C-WUS reception indicates one or more types of LP-C-WUSs supported by an LP-WUR of the network node, and the LP-C-WUS is a type of LP-C-WUS from the one or more types of LP-C-WUSs supported by the LP-WUR of the network node.

In one aspect, the one or more types of LP-C-WUSs supported by the LP-WUR of the network node include one or more of an OOK based waveform, an FSK based OFDM signal, a sequence based signal, a DFT based sequence, or a PDCCH based signal.

In one aspect, the indication of the network capability for LP-C-WUS reception indicates at least one of one or more frequency bands or one or more frequency ranges in which LP-C-WUS reception is supported.

In one aspect, the indication of the UE capability for LP-C-WUS transmission indicates whether the UE supports LP-C-WUS transmission.

In one aspect, the indication of the UE capability for LP-C-WUS transmission indicates whether the UE supports transmission of one or more types of LP-C-WUS per frequency band, frequency band combination, frequency range, frequency range combination, component carrier, or component carrier combination.

In one aspect, the indication of the UE capability for LP-C-WUS transmission is included in a RACH message, a response to the indication of the network capability for LP-C-WUS reception, UAI, an RRC message, a MAC-CE, or UCI.

In one aspect, LP-C-WUS transmission is enabled for the UE in a full coverage area of a cell associated with the network node, or LP-C-WUS transmission is enabled for the UE in a partial coverage area that is within the full coverage area and smaller than the full coverage area.

In one aspect, transmitting the LP-C-WUS in the LP-C-WUS occasion of the one or more LP-C-WUS occasions includes transmitting the LP-C-WUS using a first set of transmit parameters in connection with the LP-C-WUS transmission being enabled in the full coverage area or using a second set of transmit parameters in connection with the LP-C-WUS being enabled in the partial coverage area.

In one aspect, LP-C-WUS transmission is enabled in a first coverage area of a cell associated with the network node, non-LP C-WUS transmission is enabled in a second coverage area of the cell associated with the network node, and the first coverage area is within the second coverage area and smaller than the second coverage area.

In one aspect, transmitting the LP-C-WUS in the LP-C-WUS occasion of the one or more LP-C-WUS occasions includes transmitting the LP-C-WUS in the LP-C-WUS occasion in connection with the UE being within the first coverage area.

In one aspect, method 1100 further includes transmitting, to the network node, a non-LP C-WUS in connection with the UE being outside of the first coverage area and within the second coverage area.

In one aspect, method 1100 further includes selecting whether to transmit the LP-C-WUS or to transmit a non-LP C-WUS based at least in part on at least one of a distance measurement, a pathloss measurement, a CSI measurement, a channel metric, a mobility measurement, a position measurement, or a relative position of the UE with respect to the network node.

In one aspect, method 1100 further includes receiving an indication configuring LP-C-WUS transmission or non-LP C-WUS transmission for the UE, wherein the indication is based at least in part on one or more network measurements.

In one aspect, the UE supports LP-C-WUS transmission and non-LP C-WUS transmission, and method 1100 further includes selecting whether to transmit the LP-C-WUS in one of the one or more LP-C-WUS monitoring occasions or to transmit a non-LP C-WUS in a non-LP C-WUS monitoring occasion based at least in part on at least one of one or more traffic characteristics of traffic associated with the UE or an RRC mode of the UE.

In one aspect, method 1100 further includes receiving a configuration of at least one of first transmit parameters for the LP-C-WUS or second transmit parameters for the non-LP C-WUS.

In one aspect, the cell DRX configuration indicates the one or more LP-C-WUS monitoring occasions in the cell DRX cycle and one or more non-LP C-WUS monitoring occasions in the cell DRX cycle.

In one aspect, the one or more non-LP C-WUS monitoring occasions in the cell DRX cycle include a first non-LP C-WUS monitoring occasion and a second non-LP C-WUS monitoring occasion, and the one or more LP-C-WUS monitoring occasions are between the first non-LP C-WUS monitoring occasion and the second non-LP C-WUS monitoring occasion.

In one aspect, the one or more LP-C-WUS monitoring occasions include a first LP-C-WUS monitoring occasion associated with a first type of LP-C-WUS and a second LP-C-WUS monitoring occasion associated with a second type of LP-C-WUS.

In one aspect, the cell DRX configuration indicates a time gap between the first LP-C-WUS monitoring occasion and the second LP-C-WUS monitoring occasion.

In one aspect, the cell DRX configuration includes a first cell DRX configuration of a first cell DRX cycle associated with an LP-WUR of the network node, the first cell DRX cycle including the one or more LP-C-WUS monitoring occasions, and a second cell DRX configuration of a second cell DRX cycle associated with a main radio of the network node, the second DRX cycle including one or more non-LP C-WUS monitoring occasions.

In one aspect, method 1100 further includes receiving, from the network node, an indication that enables LP-C-WUS transmission, wherein transmitting the LP-C-WUS is based at least in part on receiving the indication that enables LP-C-WUS transmission.

In one aspect, method 1100 further includes receiving, from another UE, a request to transmit the LP-C-WUS, wherein transmitting the LP-C-WUS is based at least in part on receiving the request to transmit the LP-C-WUS.

In one aspect, the one or more LP-C-WUS monitoring occasions include dedicated time resources configured for transmission of the LP-C-WUS, or a dedicated frequency band is configured for transmission of the LP-C-WUS.

In one aspect, method 1100 further includes transmitting, to the network node, one or more synchronization signals for synchronization of an LP-WUR of the network node, wherein the one or more synchronization signals include at least one of a periodic synchronization signal or a preamble symbol transmitted with the LP-C-WUS.

In one aspect, transmitting the LP-C-WUS includes transmitting the LP-C-WUS based at least in part on a QCL relation between the LP-C-WUS and a non-LP C-WUS, a QCL relation between the LP-C-WUS and an SSB, a QCL relation between the LP-C-WUS and an SRS, a QCL relation between the LP-C-WUS and another LP-C-WUS, or a QCL relation between the LP-C-WUS and a synchronization signal for synchronization of an LP-WUR of the network node.

In one aspect, a payload of the LP-C-WUS indicates at least one of a wake-up indication, a requested duration for an active time for the network node, a requested start time for the active time for the network node, an SSB request, a SIB1 request, an SSSG configuration index to be used for PDCCH monitoring, an energy request for wireless charging by the UE, an indication of traffic to be transmitted by the UE, a priority or QoS of the traffic to be transmitted by the UE, a type of the traffic to be transmitted by the UE, a capability of the UE, an uplink BSR, or a maximum size of a downlink BSR supported by the UE in a subsequent time period.

Figure 13:
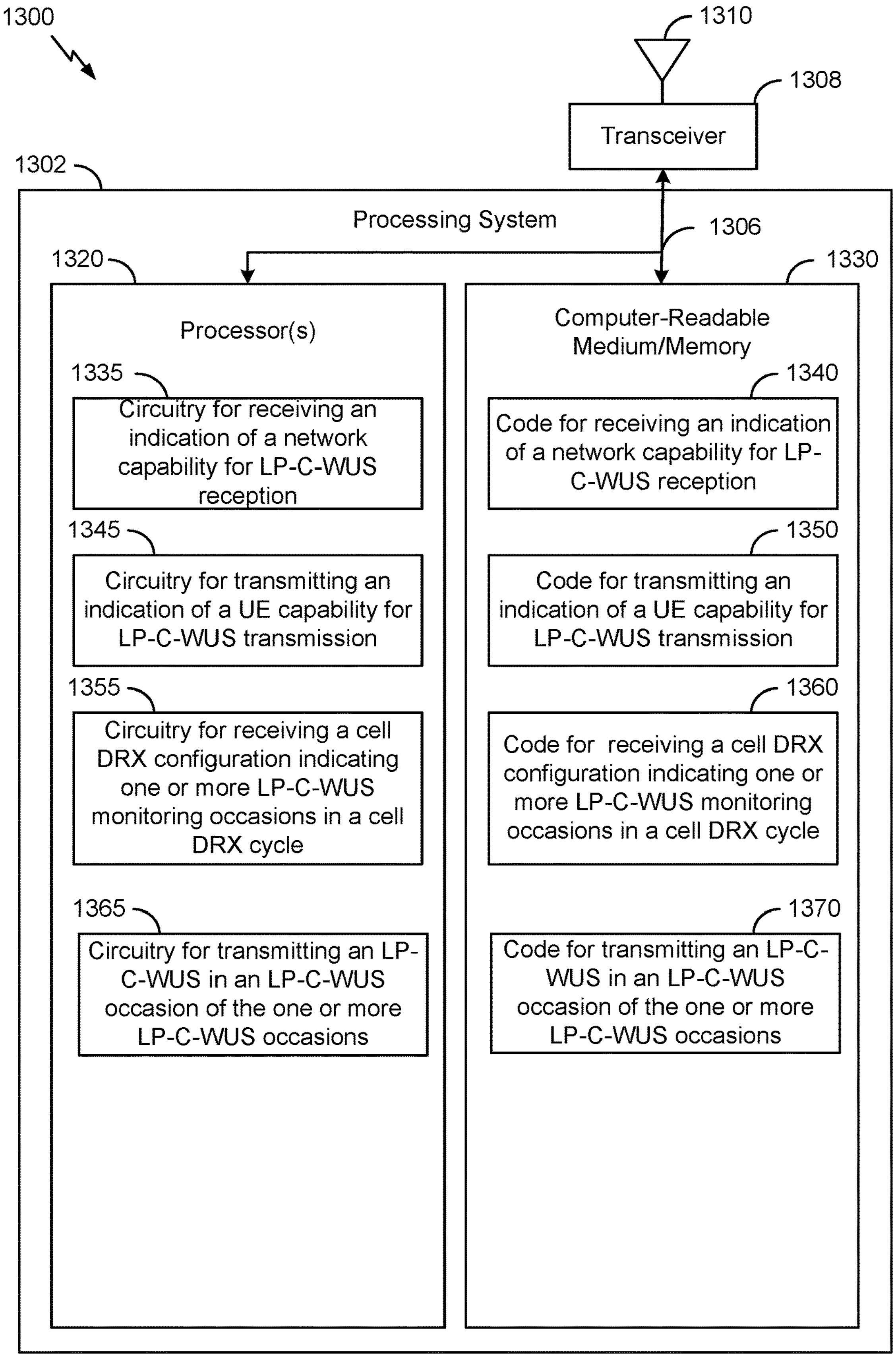
FIG. 13 is a diagram illustrating an example of an implementation of code and circuitry for a communications device, in accordance with the present disclosure.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
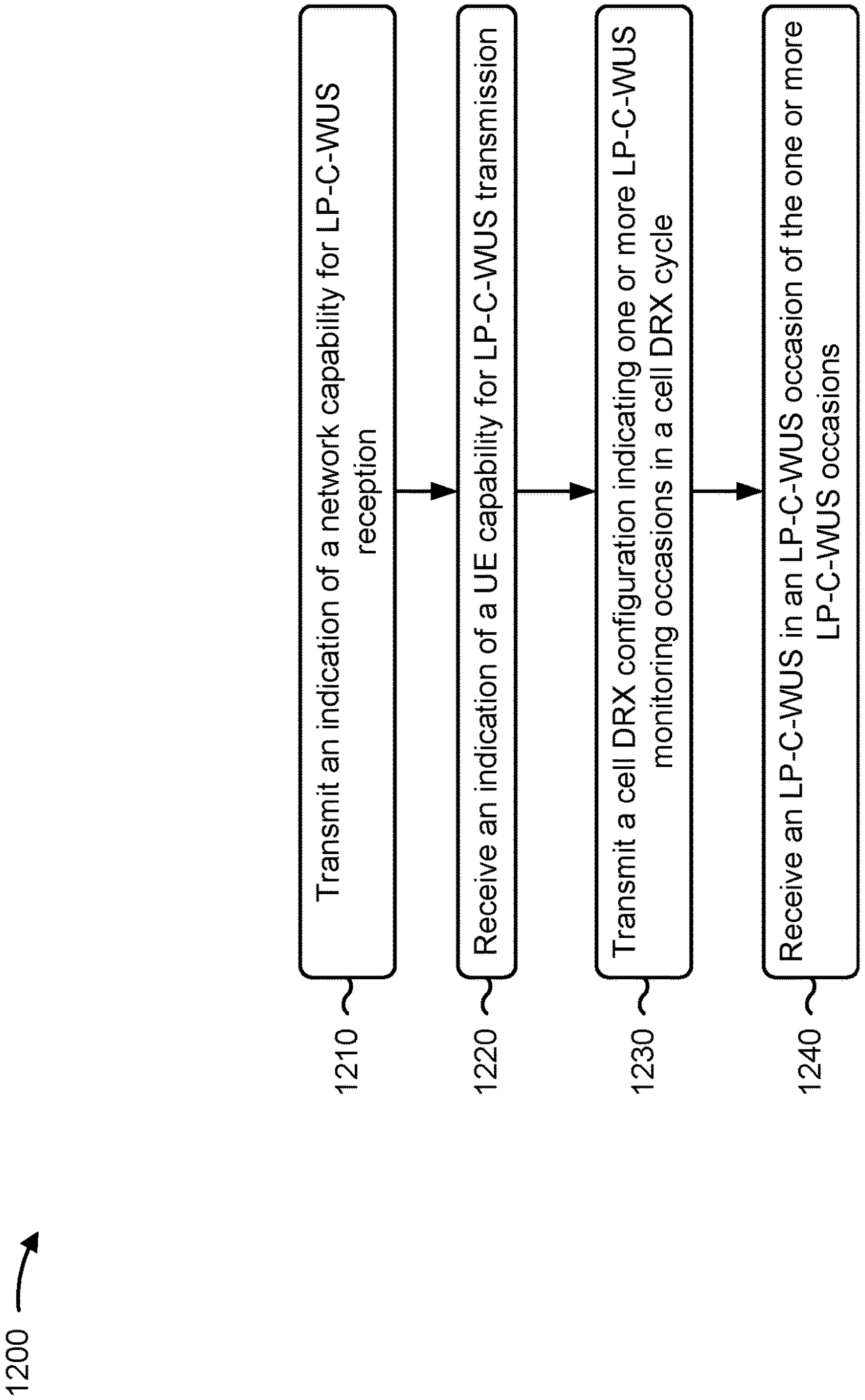
FIG. 12 shows a method for wireless communication by a network node, in accordance with the present disclosure.

FIG. 12 shows a method 1200 for wireless communication by a network node, such as BS 110, or a disaggregated base station as discussed with respect to FIG. 3.

Method 1200 begins at 1210 with transmitting an indication of a network capability for LP-C-WUS reception.

Method 1200 then proceeds to step 1220 with receiving an indication of a UE capability for LP-C-WUS transmission.

Method 1200 then proceeds to step 1230 with transmitting a cell DRX configuration indicating one or more LP-C-WUS monitoring occasions in a cell DRX cycle.

Method 1200 then proceeds to step 1240 with receiving an LP-C-WUS in an LP-C-WUS occasion of the one or more LP-C-WUS occasions.

In one aspect, the indication of the network capability for LP-C-WUS reception is included in an SSB, a SIB1, another SIB, an RRC message, a MAC-CE, or DCI.

In one aspect, the indication of the network capability for LP-C-WUS reception indicates whether the network node supports LP-C-WUS reception.

In one aspect, the indication of the network capability for LP-C-WUS reception indicates one or more types of LP-C-WUSs supported by an LP-WUR of the network node, and the LP-C-WUS is a type of LP-C-WUS from the one or more types of LP-C-WUSs supported by the LP-WUR of the network node.

In one aspect, the one or more types of LP-C-WUSs supported by the LP-WUR of the network node include one or more of an OOK based waveform, an FSK based OFDM signal, a sequence based signal, a DFT based sequence, or a PDCCH based signal.

In one aspect, the indication of the network capability for LP-C-WUS reception indicates at least one of one or more frequency bands or one or more frequency ranges in which LP-C-WUS reception is supported.

In one aspect, the indication of the UE capability for LP-C-WUS transmission indicates whether the UE supports LP-C-WUS transmission.

In one aspect, the indication of the UE capability for LP-C-WUS transmission indicates whether the UE supports transmission of one or more types of LP-C-WUS per frequency band, frequency band combination, frequency range, frequency range combination, component carrier, or component carrier combination.

In one aspect, the indication of the UE capability for LP-C-WUS transmission is included in an RACH message, a response to the indication of the network capability for LP-C-WUS reception, UAI, an RRC message, a MAC-CE, or UCI.

In one aspect, LP-C-WUS transmission is enabled for the UE in a full coverage area of a cell associated with the network node, or LP-C-WUS transmission is enabled for the UE in a partial coverage area that is within the full coverage area and smaller than the full coverage area.

In one aspect, LP-C-WUS transmission is enabled in a first coverage area of a cell associated with the network node, non-LP C-WUS transmission is enabled in a second coverage area of the cell associated with the network node, and the first coverage area is within the second coverage area and smaller than the second coverage area.

In one aspect, receiving the LP-C-WUS in the LP-C-WUS occasion of the one or more LP-C-WUS occasions includes receiving the LP-C-WUS in the LP-C-WUS occasion in connection with the UE being within the first coverage area.

In one aspect, method 1200 further includes receiving, to the network node, a non-LP C-WUS in connection with the UE being outside of the first coverage area and within the second coverage area.

In one aspect, method 1200 further includes transmitting an indication configuring LP-C-WUS transmission or non-LP C-WUS transmission for the UE, wherein the indication is based at least in part on one or more network measurements.

In one aspect, method 1200 further includes transmitting a configuration of at least one of first transmit parameters for the LP-C-WUS or second transmit parameters for a non-LP C-WUS.

In one aspect, the cell DRX configuration indicates the one or more LP-C-WUS monitoring occasions in the cell DRX cycle and one or more non-LP C-WUS monitoring occasions in the cell DRX cycle.

In one aspect, the one or more non-LP C-WUS monitoring occasions in the cell DRX cycle include a first non-LP C-WUS monitoring occasion and a second non-LP C-WUS monitoring occasion, and the one or more LP-C-WUS monitoring occasions are between the first non-LP C-WUS monitoring occasion and the second non-LP C-WUS monitoring occasion.

In one aspect, the one or more LP-C-WUS monitoring occasions include a first LP-C-WUS monitoring occasion associated with a first type of LP-C-WUS and a second LP-C-WUS monitoring occasion associated with a second type of LP-C-WUS.

In one aspect, the cell DRX configuration indicates a time gap between the first LP-C-WUS monitoring occasion and the second LP-C-WUS monitoring occasion.

In one aspect, the cell DRX configuration includes a first cell DRX configuration of a first cell DRX cycle associated with an LP-WUR of the network node, the first cell DRX cycle including the one or more LP-C-WUS monitoring occasions, and a second cell DRX configuration of a second cell DRX cycle associated with a main radio of the network node, the second DRX cycle including one or more non-LP C-WUS monitoring occasions.

In one aspect, method 1200 further includes transmitting an indication that enables LP-C-WUS transmission, wherein receiving the LP-C-WUS is based at least in part on transmitting the indication that enables LP-C-WUS transmission.

In one aspect, the one or more LP-C-WUS monitoring occasions include dedicated time resources configured for the LP-C-WUS, or a dedicated frequency band is configured for the LP-C-WUS.

In one aspect, method 1200 further includes receiving one or more synchronization signals for synchronization of an LP-WUR of the network node, wherein the one or more synchronization signals include at least one of a periodic synchronization signal or a preamble symbol transmitted with the LP-C-WUS.

In one aspect, transmitting the LP-C-WUS includes receiving the LP-C-WUS based at least in part on a QCL relation between the LP-C-WUS and a non-LP C-WUS, a QCL relation between the LP-C-WUS and an SSB, a QCL relation between the LP-C-WUS and an SRS, a QCL relation between the LP-C-WUS and another LP-C-WUS, or a QCL relation between the LP-C-WUS and a synchronization signal for synchronization of an LP-WUR of the network node.

In one aspect, a payload of the LP-C-WUS indicates at least one of a wake-up indication, a requested duration for an active time for the network node, a requested start time for the active time for the network node, an SSB request, a SIB1 request, an SSSG configuration index to be used for PDCCH monitoring, an energy request for wireless charging by the UE, an indication of traffic to be transmitted by the UE, a priority or QoS of the traffic to be transmitted by the UE, a type of the traffic to be transmitted by the UE, a capability of the UE, an uplink BSR, or a maximum size of a downlink BSR supported by the UE in a subsequent time period.

In one aspect, receiving the LP-C-WUS includes receiving the LP-C-WUS using an LP-WUR of the network node while a main radio of the network node is in a sleep state, and method 1200 further includes switching the main radio to an active state in connection with receiving the LP-C-WUS, and communicating with the UE using the main radio while the main radio is in the active state.

Figure 14:
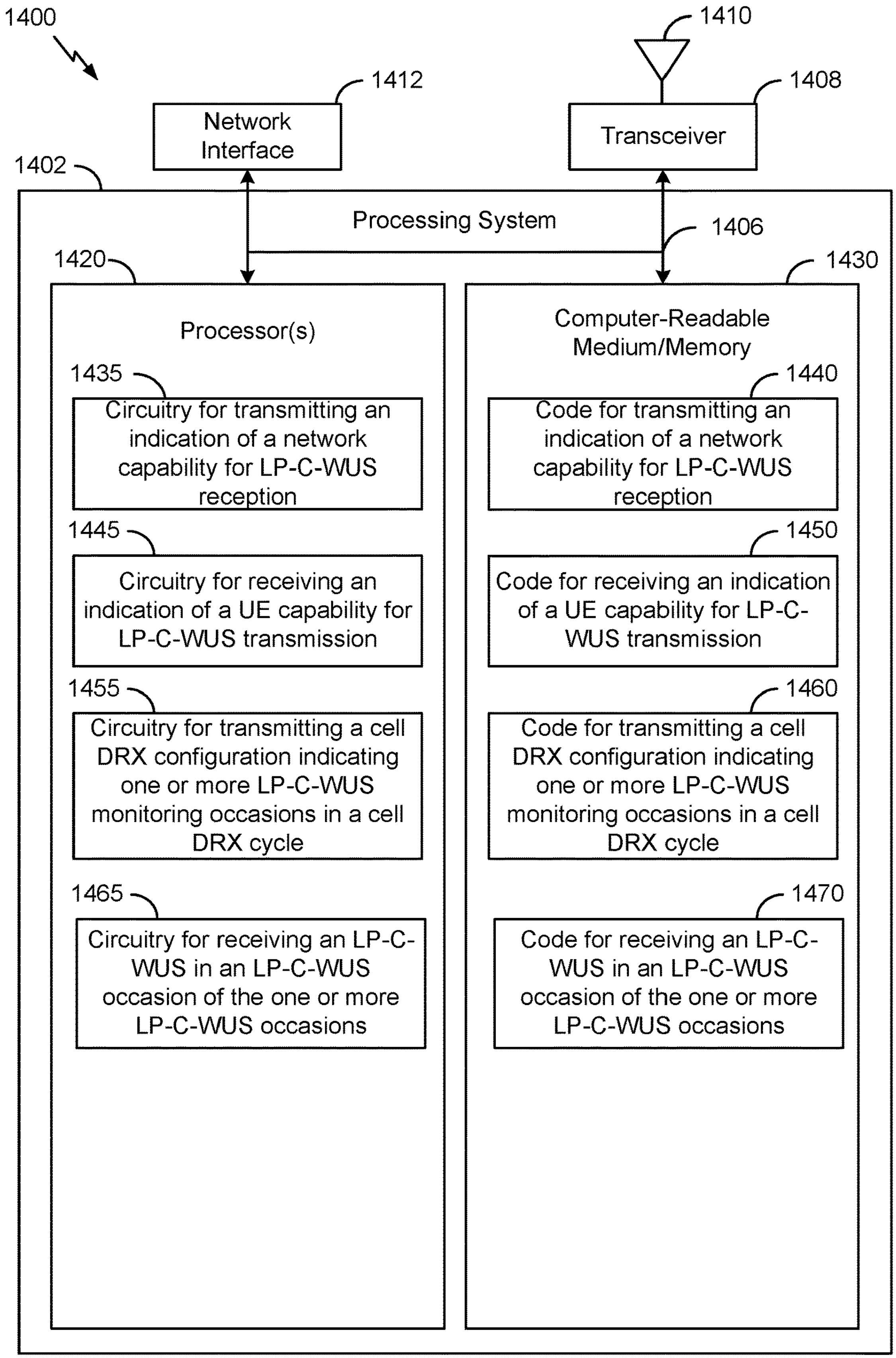
FIG. 14 is a diagram illustrating an example of an implementation of code and circuitry for a communications device, in accordance with the present disclosure.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

FIG. 13 is a diagram illustrating an example of an implementation of code and circuitry for a communications device 1300, in accordance with the present disclosure. The communications device 1300 may be a UE, or a UE may include the communications device 1300.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 258, transmit processor 264, TX MIMO processor 266, and/or controller/processor 280, as described with respect to FIG. 2. The one or more processors 1320 are coupled to a computer-readable medium/memory 1330 via a bus 1306. In various aspects, the computer-readable medium/memory 1330 may be representative of memory 282, as described with respect to FIG. 2. In certain aspects, the computer-readable medium/memory 1330 is configured to store instructions (e.g., computer-executable code, processor-executable code) that when executed by the one or more processors 1320, cause the one or more processors 1320 to perform the method 1100 described with respect to FIG. 11, or any aspect related to it. Note that reference to a processor performing a function of communications device 1300 may include one or more processors performing that function of communications device 1300.

As shown in FIG. 13, the communications device 1300 may include circuitry for receiving, from a network node, an indication of a network capability for LP-C-WUS reception (circuitry 1335).

As shown in FIG. 13, the communications device 1300 may include, stored in computer-readable medium/memory 1330, code for receiving, from a network node, an indication of a network capability for LP-C-WUS reception (code 1340).

As shown in FIG. 13, the communications device 1300 may include circuitry for transmitting, to the network node, an indication of a UE capability for LP-C-WUS transmission (circuitry 1345).

As shown in FIG. 13, the communications device 1300 may include, stored in computer-readable medium/memory 1330, code for transmitting, to the network node, an indication of a UE capability for LP-C-WUS transmission (code 1350).

As shown in FIG. 13, the communications device 1300 may include circuitry for receiving, from the network node, a cell DRX configuration indicating one or more LP-C-WUS monitoring occasions in a cell DRX cycle (circuitry 1355).

As shown in FIG. 13, the communications device 1300 may include, stored in computer-readable medium/memory 1330, code for receiving, from the network node, a cell DRX configuration indicating one or more LP-C-WUS monitoring occasions in a cell DRX cycle (code 1360).

As shown in FIG. 13, the communications device 1300 may include circuitry for transmitting, to the network node, an LP-C-WUS in an LP-C-WUS occasion of the one or more LP-C-WUS occasions (circuitry 1365).

As shown in FIG. 13, the communications device 1300 may include, stored in computer-readable medium/memory 1330, code for transmitting, to the network node, an LP-C-WUS in an LP-C-WUS occasion of the one or more LP-C-WUS occasions (code 1370).

Various components of the communications device 1300 may provide means for performing the method 1100 described with respect to FIG. 11, or any aspect related to it. For example, means for transmitting, sending, or outputting for transmission may include the transceiver(s) 254 and/or antenna(s) 252 of the UE 120 and/or transceiver 1308 and antenna 1310 of the communications device 1300 in FIG. 13. Means for receiving or obtaining may include the transceiver(s) 254 and/or antenna(s) 252 of the UE 120 and/or transceiver 1308 and antenna 1310 of the communications device 1300 in FIG. 13.

FIG. 13 is provided as an example. Other examples may differ from what is described in connection with FIG. 13.

FIG. 14 is a diagram illustrating an example of an implementation of code and circuitry for a communications device 1400, in accordance with the present disclosure. The communications device 1400 may be a network node (such as BS 110 or a disaggregated base station as described with regard to FIG. 3), or a network node may include the communications device 1400.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The network interface 1412 is configured to obtain and send signals for the communications device 1400 via communications link(s), such as a backhaul link, midhaul link, and/or fronthaul link as described herein, such as with respect to FIG. 3. The processing system 1402 may be configured to perform processing functions for the communications device 1400, including processing signals received and/or to be transmitted by the communications device 1400.

The processing system 1402 includes one or more processors 1420. In various aspects, the one or more processors 1420 may be representative of one or more of receive processor 238, transmit processor 220, TX MIMO processor 230, and/or controller/processor 240, as described with respect to FIG. 2. The one or more processors 1420 are coupled to a computer-readable medium/memory 1430 via a bus 1406. In various aspects, the computer-readable medium/memory 1430 may be representative of memory 242, as described with respect to FIG. 2. In certain aspects, the computer-readable medium/memory 1430 is configured to store instructions (e.g., computer-executable code, processor-executable code) that when executed by the one or more processors 1420, cause the one or more processors 1420 to perform the method 1200 described with respect to FIG. 12, or any aspect related to it. Note that reference to a processor performing a function of communications device 1400 may include one or more processors performing that function of communications device 1400.

As shown in FIG. 14, the communications device 1400 may include circuitry for transmitting an indication of a network capability for LP-C-WUS reception (circuitry 1435).

As shown in FIG. 14, the communications device 1400 may include, stored in computer-readable medium/memory 1430, code for transmitting an indication of a network capability for LP-C-WUS reception (code 1440).

As shown in FIG. 14, the communications device 1400 may include circuitry for receiving an indication of a UE capability for LP-C-WUS transmission (circuitry 1445).

As shown in FIG. 14, the communications device 1400 may include, stored in computer-readable medium/memory 1430, code for receiving an indication of a UE capability for LP-C-WUS transmission (code 1450).

As shown in FIG. 14, the communications device 1400 may include circuitry for transmitting a cell DRX configuration indicating one or more LP-C-WUS monitoring occasions in a cell DRX cycle (circuitry 1455).

As shown in FIG. 14, the communications device 1400 may include, stored in computer-readable medium/memory 1430, code for transmitting a cell DRX configuration indicating one or more LP-C-WUS monitoring occasions in a cell DRX cycle (code 1460).

As shown in FIG. 14, the communications device 1400 may include circuitry for receiving an LP-C-WUS in an LP-C-WUS occasion of the one or more LP-C-WUS occasions (circuitry 1465).

As shown in FIG. 14, the communications device 1400 may include, stored in computer-readable medium/memory 1430, code for receiving an LP-C-WUS in an LP-C-WUS occasion of the one or more LP-C-WUS occasions (code 1470).

Various components of the communications device 1400 may provide means for performing the method 1200 described with respect to FIG. 12, or any aspect related to it. For example, means for transmitting, sending, or outputting for transmission may include the transceiver(s) 232 and/or antenna(s) 234 of the BS 110 and/or transceiver 1408 and antenna 1410 of the communications device 1400 in FIG. 14. Means for receiving or obtaining may include the transceiver(s) 232 and/or antenna(s) 234 of the BS 110 and/or transceiver 1408 and antenna 1410 of the communications device 1400 in FIG. 14.

FIG. 14 is provided as an example. Other examples may differ from what is described in connection with FIG. 14.

The following provides an overview of some Aspects of the present disclosure:

Aspect 1: A method of wireless communication performed by a user equipment (UE), comprising: receiving, from a network node, an indication of a network capability for low power cell wake-up signal (LP-C-WUS) reception; transmitting, to the network node, an indication of a UE capability for LP-C-WUS transmission; receiving, from the network node, a cell discontinuous reception (DRX) configuration indicating one or more LP-C-WUS monitoring occasions in a cell DRX cycle; and transmitting, to the network node, an LP-C-WUS in an LP-C-WUS occasion of the one or more LP-C-WUS occasions.

Aspect 2: The method of Aspect 1, wherein the indication of the network capability for LP-C-WUS reception is included in a synchronization signal block (SSB), a system information block (SIB) type 1 (SIB1), another SIB, a radio resource control (RRC) message, a medium access control (MAC) control element (MAC-CE), or downlink control information (DCI).

Aspect 3: The method of any of Aspects 1-2, wherein the indication of the network capability for LP-C-WUS reception indicates whether the network node supports LP-C-WUS reception.

Aspect 4: The method of any of Aspects 1-3, wherein the indication of the network capability for LP-C-WUS reception indicates one or more types of LP-C-WUSs supported by a low power wake-up radio (LP-WUR) of the network node, and wherein the LP-C-WUS is a type of LP-C-WUS from the one or more types of LP-C-WUSs supported by the LP-WUR of the network node.

Aspect 5: The method of Aspect 4, wherein the one or more types of LP-C-WUSs supported by the LP-WUR of the network node include one or more of: an on-off keying (OOK) based waveform, a frequency-shift keying (FSK) based orthogonal frequency division multiplexing (OFDM) signal, a sequence based signal, a discrete Fourier transform (DFT) based sequence, or a physical downlink control channel (PDCCH) based signal.

Aspect 6: The method of any of Aspects 1-5, wherein the indication of the network capability for LP-C-WUS reception indicates at least one of one or more frequency bands or one or more frequency ranges in which LP-C-WUS reception is supported.

Aspect 7: The method of any of Aspects 1-6, wherein the indication of the UE capability for LP-C-WUS transmission indicates whether the UE supports LP-C-WUS transmission.

Aspect 8: The method of any of Aspects 1-7, wherein the indication of the UE capability for LP-C-WUS transmission indicates whether the UE supports transmission of one or more types of LP-C-WUS per frequency band, frequency band combination, frequency range, frequency range combination, component carrier, or component carrier combination.

Aspect 9: The method of any of Aspects 1-8, wherein the indication of the UE capability for LP-C-WUS transmission is included in a random access channel (RACH) message, a response to the indication of the network capability for LP-C-WUS reception, UE assistance information (UAI), a radio resource control (RRC) message, a medium access control (MAC) control element (MAC-CE), or uplink control information (UCI).

Aspect 10: The method of any of Aspects 1-9, wherein LP-C-WUS transmission is enabled for the UE in a full coverage area of a cell associated with the network node, or LP-C-WUS transmission is enabled for the UE in a partial coverage area that is within the full coverage area and smaller than the full coverage area.

Aspect 11: The method of Aspect 10, wherein transmitting the LP-C-WUS in the LP-C-WUS occasion of the one or more LP-C-WUS occasions comprises: transmitting the LP-C-WUS using a first set of transmit parameters in connection with the LP-C-WUS transmission being enabled in the full coverage area or using a second set of transmit parameters in connection with the LP-C-WUS being enabled in the partial coverage area.

Aspect 12: The method of any of Aspects 1-11, wherein LP-C-WUS transmission is enabled in a first coverage area of a cell associated with the network node, wherein non-low-power (non-LP) cell wake-up signal (C-WUS) transmission is enabled in a second coverage area of the cell associated with the network node, and wherein the first coverage area is within the second coverage area and smaller than the second coverage area.

Aspect 13: The method of Aspect 12, wherein transmitting the LP-C-WUS in the LP-C-WUS occasion of the one or more LP-C-WUS occasions comprises: transmitting the LP-C-WUS in the LP-C-WUS occasion in connection with the UE being within the first coverage area.

Aspect 14: The method of Aspect 12, further comprising: transmitting, to the network node, a non-LP C-WUS in connection with the UE being outside of the first coverage area and within the second coverage area.

Aspect 15: The method of Aspect 12, further comprising: selecting whether to transmit the LP-C-WUS or to transmit a non-LP C-WUS based at least in part on at least one of a distance measurement, a pathloss measurement, a channel state information (CSI) measurement, a channel metric, a mobility measurement, a position measurement, or a relative position of the UE with respect to the network node.

Aspect 16: The method of Aspect 12, further comprising: receiving an indication configuring LP-C-WUS transmission or non-LP C-WUS transmission for the UE, wherein the indication is based at least in part on one or more network measurements.

Aspect 17: The method of any of Aspects 1-16, wherein the UE supports LP-C-WUS transmission and non-low-power (non-LP) cell wake-up signal (C-WUS) transmission, and wherein the method further comprises: selecting whether to transmit the LP-C-WUS in one of the one or more LP-C-WUS monitoring occasions or to transmit a non-LP C-WUS in a non-LP C-WUS monitoring occasion based at least in part on at least one of one or more traffic characteristics of traffic associated with the UE or a radio resource control (RRC) mode of the UE.

Aspect 18: The method of Aspect 17, further comprising: receiving a configuration of at least one of first transmit parameters for the LP-C-WUS or second transmit parameters for the non-LP C-WUS.

Aspect 19: The method of any of Aspects 1-18, wherein the cell DRX configuration indicates the one or more LP-C-WUS monitoring occasions in the cell DRX cycle and one or more non-low-power (non-LP) cell wake-up signal (C-WUS) monitoring occasions in the cell DRX cycle.

Aspect 20: The method of Aspect 19, wherein the one or more non-LP C-WUS monitoring occasions in the cell DRX cycle include a first non-LP C-WUS monitoring occasion and a second non-LP C-WUS monitoring occasion, and wherein the one or more LP-C-WUS monitoring occasions are between the first non-LP C-WUS monitoring occasion and the second non-LP C-WUS monitoring occasion.

Aspect 21: The method of any of Aspects 1-20, wherein the one or more LP-C-WUS monitoring occasions include a first LP-C-WUS monitoring occasion associated with a first type of LP-C-WUS and a second LP-C-WUS monitoring occasion associated with a second type of LP-C-WUS.

Aspect 22: The method of Aspect 21, wherein the cell DRX configuration indicates a time gap between the first LP-C-WUS monitoring occasion and the second LP-C-WUS monitoring occasion.

Aspect 23: The method of any of Aspects 1-22, wherein the cell DRX configuration includes: a first cell DRX configuration of a first cell DRX cycle associated with a low-power wake-up radio (LP-WUR) of the network node, the first cell DRX cycle including the one or more LP-C-

WUS monitoring occasions, and a second cell DRX configuration of a second cell DRX cycle associated with a main radio of the network node, the second DRX cycle including one or more non-low-power (non-LP) cell wake-up signal (C-WUS) monitoring occasions.

Aspect 24: The method of any of Aspects 1-23, further comprising: receiving, from the network node, an indication that enables LP-C-WUS transmission, wherein transmitting the LP-C-WUS is based at least in part on receiving the indication that enables LP-C-WUS transmission.

Aspect 25: The method of any of Aspects 1-24, further comprising: receiving, from another UE, a request to transmit the LP-C-WUS, wherein transmitting the LP-C-WUS is based at least in part on receiving the request to transmit the LP-C-WUS.

Aspect 26: The method of any of Aspects 1-25, wherein the one or more LP-C-WUS monitoring occasions include dedicated time resources configured for transmission of the LP-C-WUS, or a dedicated frequency band is configured for transmission of the LP-C-WUS.

Aspect 27: The method of any of Aspects 1-26, further comprising: transmitting, to the network node, one or more synchronization signals for synchronization of a low-power wake-up radio (LP-WUR) of the network node, wherein the one or more synchronization signals include at least one of a periodic synchronization signal or a preamble symbol transmitted with the LP-C-WUS.

Aspect 28: The method of any of Aspects 1-27, wherein transmitting the LP-C-WUS comprises: transmitting the LP-C-WUS based at least in part on a quasi co-location (QCL) relation between the LP-C-WUS and a non-low-power (non-LP) cell wake-up signal (C-WUS), a QCL relation between the LP-C-WUS and a synchronization signal block (SSB), a QCL relation between the LP-C-WUS and a sounding reference signal (SRS), a QCL relation between the LP-C-WUS and another LP-C-WUS, or a QCL relation between the LP-C-WUS and a synchronization signal for synchronization of a low-power wake-up radio (LP-WUR) of the network node.

Aspect 29: The method of any of Aspects 1-28, wherein a payload of the LP-C-WUS indicates at least one of: a wake-up indication, a requested duration for an active time for the network node, a requested start time for the active time for the network node, a synchronization signal block (SSB) request, a system information block (SIB) type 1 (SIB1) request, a search space set group (SSSG) configuration index to be used for physical downlink control channel (PDCCH) monitoring, an energy request for wireless charging by the UE, an indication of traffic to be transmitted by the UE, a priority or quality of service (QoS) of the traffic to be transmitted by the UE, a type of the traffic to be transmitted by the UE, a capability of the UE, an uplink buffer status report (BSR), or a maximum size of a downlink BSR supported by the UE in a subsequent time period.

Aspect 30: A method of wireless communication performed by a network node, comprising: transmitting an indication of a network capability for low power cell wake-up signal (LP-C-WUS) reception; receiving an indication of a user equipment (UE) capability for LP-C-WUS transmission; transmitting a cell discontinuous reception (DRX) configuration indicating one or more LP-C-WUS monitoring occasions in a cell DRX cycle; and receiving an LP-C-WUS in an LP-C-WUS occasion of the one or more LP-C-WUS occasions.

Aspect 31: The method of Aspect 30, wherein the indication of the network capability for LP-C-WUS reception is included in a synchronization signal block (SSB), a system information block (SIB) type 1 (SIB1), another SIB, a radio resource control (RRC) message, a medium access control (MAC) control element (MAC-CE), or downlink control information (DCI).

Aspect 32: The method of any of Aspects 30-31, wherein the indication of the network capability for LP-C-WUS reception indicates whether the network node supports LP-C-WUS reception.

Aspect 33: The method of any of Aspects 30-32, wherein the indication of the network capability for LP-C-WUS reception indicates one or more types of LP-C-WUSs supported by a low power wake-up radio (LP-WUR) of the network node, and wherein the LP-C-WUS is a type of LP-C-WUS from the one or more types of LP-C-WUSs supported by the LP-WUR of the network node.

Aspect 34: The method of Aspect 33, wherein the one or more types of LP-C-WUSs supported by the LP-WUR of the network node include one or more of: an on-off keying (OOK) based waveform, a frequency-shift keying (FSK) based orthogonal frequency division multiplexing (OFDM) signal, a sequence based signal, a discrete Fourier transform (DFT) based sequence, or a physical downlink control channel (PDCCH) based signal.

Aspect 35: The method of any of Aspects 30-34, wherein the indication of the network capability for LP-C-WUS reception indicates at least one of one or more frequency bands or one or more frequency ranges in which LP-C-WUS reception is supported.

Aspect 36: The method of any of Aspects 30-35, wherein the indication of the UE capability for LP-C-WUS transmission indicates whether the UE supports LP-C-WUS transmission.

Aspect 37: The method of any of Aspects 30-36, wherein the indication of the UE capability for LP-C-WUS transmission indicates whether the UE supports transmission of one or more types of LP-C-WUS per frequency band, frequency band combination, frequency range, frequency range combination, component carrier, or component carrier combination.

Aspect 38: The method of any of Aspects 30-37, wherein the indication of the UE capability for LP-C-WUS transmission is included in a random access channel (RACH) message, a response to the indication of the network capability for LP-C-WUS reception, UE assistance information (UAI), a radio resource control (RRC) message, a medium access control (MAC) control element (MAC-CE), or uplink control information (UCI).

Aspect 39: The method of any of Aspects 30-38, wherein LP-C-WUS transmission is enabled for the UE in a full coverage area of a cell associated with the network node, or LP-C-WUS transmission is enabled for the UE in a partial coverage area that is within the full coverage area and smaller than the full coverage area.

Aspect 40: The method of any of Aspects 30-39, wherein LP-C-WUS transmission is enabled in a first coverage area of a cell associated with the network node, wherein non-low-power (non-LP) cell wake-up signal (C-WUS) transmission is enabled in a second coverage area of the cell associated with the network node, and wherein the first coverage area is within the second coverage area and smaller than the second coverage area.

Aspect 41: The method of Aspect 40, wherein receiving the LP-C-WUS in the LP-C-WUS occasion of the one or more LP-C-WUS occasions comprises: receiving the LP-C-WUS in the LP-C-WUS occasion in connection with the UE being within the first coverage area.

Aspect 42: The method of Aspect 40, further comprising: receiving, to the network node, a non-LP C-WUS in connection with the UE being outside of the first coverage area and within the second coverage area.

Aspect 43: The method of Aspect 40, further comprising: transmitting an indication configuring LP-C-WUS transmission or non-LP C-WUS transmission for the UE, wherein the indication is based at least in part on one or more network measurements.

Aspect 44: The method of any of Aspects 30-43, further comprising: transmitting a configuration of at least one of first transmit parameters for the LP-C-WUS or second transmit parameters for a non-low-power (non-LP) cell wake-up signal (C-WUS).

Aspect 45: The method of any of Aspects 30-44, wherein the cell DRX configuration indicates the one or more LP-C-WUS monitoring occasions in the cell DRX cycle and one or more non-low-power (non-LP) cell wake-up signal (C-WUS) monitoring occasions in the cell DRX cycle.

Aspect 46: The method of Aspect 45, wherein the one or more non-LP C-WUS monitoring occasions in the cell DRX cycle include a first non-LP C-WUS monitoring occasion and a second non-LP C-WUS monitoring occasion, and wherein the one or more LP-C-WUS monitoring occasions are between the first non-LP C-WUS monitoring occasion and the second non-LP C-WUS monitoring occasion.

Aspect 47: The method of any of Aspects 30-46, wherein the one or more LP-C-WUS monitoring occasions include a first LP-C-WUS monitoring occasion associated with a first type of LP-C-WUS and a second LP-C-WUS monitoring occasion associated with a second type of LP-C-WUS.

Aspect 48: The method of Aspect 47, wherein the cell DRX configuration indicates a time gap between the first LP-C-WUS monitoring occasion and the second LP-C-WUS monitoring occasion.

Aspect 49: The method of any of Aspects 30-48, wherein the cell DRX configuration includes: a first cell DRX configuration of a first cell DRX cycle associated with a low-power wake-up radio (LP-WUR) of the network node, the first cell DRX cycle including the one or more LP-C-WUS monitoring occasions, and a second cell DRX configuration of a second cell DRX cycle associated with a main radio of the network node, the second DRX cycle including one or more non-low-power (non-LP) cell wake-up signal (C-WUS) monitoring occasions.

Aspect 50: The method of any of Aspects 30-49, further comprising: transmitting an indication that enables LP-C-WUS transmission, wherein receiving the LP-C-WUS is based at least in part on transmitting the indication that enables LP-C-WUS transmission.

Aspect 51: The method of any of Aspects 30-50, wherein the one or more LP-C-WUS monitoring occasions include dedicated time resources configured for the LP-C-WUS, or a dedicated frequency band is configured for the LP-C-WUS.

Aspect 52: The method of any of Aspects 30-51, further comprising: receiving one or more synchronization signals for synchronization of a low-power wake-up radio (LP-WUR) of the network node, wherein the one or more synchronization signals include at least one of a periodic synchronization signal or a preamble symbol transmitted with the LP-C-WUS.

Aspect 53: The method of any of Aspects 30-52, wherein transmitting the LP-C-WUS comprises: receiving the LP-C-WUS based at least in part on a quasi co-location (QCL) relation between the LP-C-WUS and a non-low-power (non-LP) cell wake-up signal (C-WUS), a QCL relation between the LP-C-WUS and a synchronization signal block (SSB), a QCL relation between the LP-C-WUS and a sounding reference signal (SRS), a QCL relation between the LP-C-WUS and another LP-C-WUS, or a QCL relation between the LP-C-WUS and a synchronization signal for synchronization of a low-power wake-up radio (LP-WUR) of the network node.

Aspect 54: The method of any of Aspects 30-53, wherein a payload of the LP-C-WUS indicates at least one of: a wake-up indication, a requested duration for an active time for the network node, a requested start time for the active time for the network node, a synchronization signal block (SSB) request, a system information block (SIB) type 1 (SIB1) request, a search space set group (SSSG) configuration index to be used for physical downlink control channel (PDCCH) monitoring, an energy request for wireless charging by the UE, an indication of traffic to be transmitted by the UE, a priority or quality of service (QoS) of the traffic to be transmitted by the UE, a type of the traffic to be transmitted by the UE, a capability of the UE, an uplink buffer status report (BSR), or a maximum size of a downlink BSR supported by the UE in a subsequent time period.

Aspect 55: The method of any of Aspects 30-54, wherein receiving the LP-C-WUS comprises receiving the LP-C-WUS using a low-power wake-up radio (LP-WUR) of the network node while a main radio of the network node is in a sleep state, and wherein the method further comprises: switching the main radio to an active state in connection with receiving the LP-C-WUS; and communicating with the UE using the main radio while the main radio is in the active state.

Aspect 56: An apparatus for wireless communication at a device, comprising a processor; memory coupled with the processor; and instructions stored in the memory and executable by the processor to cause the apparatus to perform the method of one or more of Aspects 1-55.

Aspect 57: A device for wireless communication, comprising a memory and one or more processors coupled to the memory, the one or more processors configured to perform the method of one or more of Aspects 1-55.

Aspect 58: An apparatus for wireless communication, comprising at least one means for performing the method of one or more of Aspects 1-55.

Aspect 59: A non-transitory computer-readable medium storing code for wireless communication, the code comprising instructions executable by a processor to perform the method of one or more of Aspects 1-55.

Aspect 60: A non-transitory computer-readable medium storing a set of instructions for wireless communication, the set of instructions comprising one or more instructions that, when executed by one or more processors of a device, cause the device to perform the method of one or more of Aspects 1-55.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:

one or more antennas; and a processing system that includes one or more processors and one or more memories that store code for the one or more processors, the processing system configured to cause the UE to:

receive, from a network node, an indication of a network capability for low power cell wake-up signal (LP-C-WUS) reception;

transmit, to the network node, an indication of a UE capability for LP-C-WUS transmission;

receive, from the network node, a cell discontinuous reception (DRX) configuration indicating one or more LP-C-WUS monitoring occasions and a plurality of non-low-power cell wake-up signal (non-LP C-WUS) monitoring occasions in a cell DRX cycle, wherein the one or more LP-C-WUS monitoring occasions includes a time window in which the network node is configured to monitor for an LP-C-WUS, and wherein the one or more LP-C-WUS monitoring occasions are scheduled between the plurality of non-LP C-WUS monitoring occasions; and transmit, to the network node, the LP-C-WUS in an LP-C-WUS monitoring occasion of the one or more LP-C-WUS monitoring occasions.

2. The UE of claim 1, wherein the indication of the network capability for LP-C-WUS reception is included in a system information block (SIB) type 1 (SIB1).

3. The UE of claim 1, wherein the indication of the network capability for LP-C-WUS reception indicates whether the network node supports LP-C-WUS reception.

4. The UE of claim 1, wherein the indication of the network capability for LP-C-WUS reception indicates one or more types of LP-C-WUSs supported by a low power wake-up radio (LP-WUR) of the network node, and wherein the LP-C-WUS is a type of LP-C-WUS from the one or more types of LP-C-WUSs supported by the LP-WUR of the network node.

5. The UE of claim 4, wherein the one or more types of LP-C-WUSs supported by the LP-WUR of the network node include one or more of:

an on-off keying (OOK) based waveform, a frequency-shift keying (FSK) based orthogonal frequency division multiplexing (OFDM) signal, a sequence based signal, a discrete Fourier transform (DFT) based sequence, or a physical downlink control channel (PDCCH) based signal.

6. The UE of claim 1, wherein the indication of the network capability for LP-C-WUS reception indicates at least one of one or more frequency bands or one or more frequency ranges in which LP-C-WUS reception is supported.

7. The UE of claim 1, wherein the indication of the UE capability for LP-C-WUS transmission indicates whether the UE supports LP-C-WUS transmission.

8. The UE of claim 1, wherein the indication of the UE capability for LP-C-WUS transmission indicates whether the UE supports transmission of one or more types of LP-C-WUS per frequency band, frequency band combination, frequency range, frequency range combination, component carrier, or component carrier combination.

9. The UE of claim 1, wherein the indication of the UE capability for LP-C-WUS transmission is included in a random access channel (RACH) message, a response to the indication of the network capability for LP-C-WUS reception, UE assistance information (UAI), a radio resource control (RRC) message, a medium access control (MAC) control element (MAC-CE), or uplink control information (UCI).

10. The UE of claim 1, wherein LP-C-WUS transmission is enabled for the UE in a full coverage area of a cell associated with the network node, or LP-C-WUS transmission is enabled for the UE in a partial coverage area that is within the full coverage area and smaller than the full coverage area.

11. The UE of claim 10, wherein the one or more processors, to transmit the LP-C-WUS in the LP-C-WUS occasion of the one or more LP-C-WUS occasions, are configured to cause the UE to:

transmit the LP-C-WUS using a first set of transmit parameters in connection with the LP-C-WUS transmission being enabled in the full coverage area or using a second set of transmit parameters in connection with the LP-C-WUS being enabled in the partial coverage area.

12. The UE of claim 1, wherein LP-C-WUS transmission is enabled in a first coverage area of a cell associated with the network node, wherein non-LP-C-WUS transmission is enabled in a second coverage area of the cell associated with the network node, and wherein the first coverage area is within the second coverage area and smaller than the second coverage area.

13. The UE of claim 12, wherein the one or more processors, to transmit the LP-C-WUS in the LP-C-WUS occasion, are configured to cause the UE to:

transmit the LP-C-WUS in the LP-C-WUS occasion in connection with the UE being within the first coverage area.

14. The UE of claim 12, wherein the one or more processors are further configured to cause the UE to:

transmit, to the network node, a non-LP C-WUS in connection with the UE being outside of the first coverage area and within the second coverage area.

15. The UE of claim 12, wherein the one or more processors are further configured to cause the UE to:

select whether to transmit the LP-C-WUS or to transmit a non-LP C-WUS based at least in part on at least one of a distance measurement, a pathloss measurement, a channel state information (CSI) measurement, a channel metric, a mobility measurement, a position measurement, or a relative position of the UE with respect to the network node.

16. The UE of claim 12, wherein the one or more processors are further configured to cause the UE to:

receive an indication configuring LP-C-WUS transmission or non-LP C-WUS transmission for the UE, wherein the indication is based at least in part on one or more network measurements.

17. The UE of claim 1, wherein the UE supports LP-C-WUS transmission and non-LP C-WUS transmission, and wherein the one or more processors are further configured to cause the UE to:

select whether to transmit the LP-C-WUS in one of the one or more LP-C-WUS monitoring occasions or to transmit a non-LP C-WUS in a non-LP C-WUS monitoring occasion of the plurality of non-LP C-WUS monitoring occasions based at least in part on at least one of one or more traffic characteristics of traffic associated with the UE or a radio resource control (RRC) mode of the UE.

18. The UE of claim 17, wherein the one or more processors are further configured to cause the UE to:

receive a configuration of at least one of first transmit parameters for the LP-C-WUS or second transmit parameters for the non-LP C-WUS.

19. The UE of claim 1, wherein the one or more LP-C-WUS monitoring occasions are scheduled when a main radio (MR) of the network node is in a sleep state, and wherein the plurality of non-LP C-WUS monitoring occasions are scheduled when the MR is in an active state.

20. The UE of claim 19, wherein the plurality of non-LP C-WUS monitoring occasions include a first non-LP C-WUS monitoring occasion and a second non-LP C-WUS monitoring occasion, and wherein the one or more LP-C-WUS monitoring occasions are between the first non-LP C-WUS monitoring occasion and the second non-LP C-WUS monitoring occasion.

21. The UE of claim 1, wherein the one or more LP-C-WUS monitoring occasions include a first LP-C-WUS monitoring occasion associated with a first type of LP-C-WUS and a second LP-C-WUS monitoring occasion associated with a second type of LP-C-WUS.

22. The UE of claim 21, wherein the cell DRX configuration indicates a time gap between the first LP-C-WUS monitoring occasion and the second LP-C-WUS monitoring occasion.

23. The UE of claim 1, wherein the cell DRX configuration includes:

a first cell DRX configuration of a first cell DRX cycle associated with a low-power wake-up radio (LP-WUR) of the network node, the first cell DRX cycle including the one or more LP-C-WUS monitoring occasions, and a second cell DRX configuration of a second cell DRX cycle associated with a main radio of the network node, the second DRX cycle including one or more non-LP-C-WUS monitoring occasions.

24. The UE of claim 1, wherein the one or more processors are further configured to cause the UE to:

receive, from the network node, an indication that enables LP-C-WUS transmission; and wherein the one or more processors, to transmit the LP-C-WUS, are configured to:

transmit the LP-C-WUS based at least in part on the indication that enables LP-C-WUS transmission.

25. The UE of claim 1, wherein the one or more processors are further configured to cause the UE to:

transmit, to the network node, one or more synchronization signals for synchronization of a low-power wake-up radio (LP-WUR) of the network node, wherein the one or more synchronization signals include at least one of a periodic synchronization signal or a preamble symbol transmitted with the LP-C-WUS.

26. The UE of claim 1, wherein a payload of the LP-C-WUS indicates at least one of:

a wake-up indication, a requested duration for an active time for the network node, a requested start time for the active time for the network node, a synchronization signal block (SSB) request, a system information block (SIB) type 1 (SIB1) request, a search space set group (SSSG) configuration index to be used for physical downlink control channel (PDCCH) monitoring, an energy request for wireless charging by the UE, an indication of traffic to be transmitted by the UE, a priority or quality of service (QoS) of the traffic to be transmitted by the UE, a type of the traffic to be transmitted by the UE, a capability of the UE, an uplink buffer status report (BSR), or a maximum size of a downlink BSR supported by the UE in a subsequent time period.

27. A network node for wireless communication, comprising:

one or more antennas; and a processing system that includes one or more processors and one or more memories that store code for the one or more processors, the processing system configured to cause the network node to:

transmit an indication of a network capability for low power cell wake-up signal (LP-C-WUS) reception;

receive an indication of a user equipment (UE) capability for LP-C-WUS transmission;

transmit a cell discontinuous reception (DRX) configuration indicating one or more LP-C-WUS monitoring occasions and a plurality of non-low-power cell wake-up signal (non-LP C-WUS) monitoring occasions in a cell DRX cycle, wherein the one or more LP-C-WUS monitoring occasions includes a time window in which the network node is configured to monitor for an LP-C-WUS, and wherein the one or more LP-C-WUS monitoring occasions are scheduled between the plurality of non-LP C-WUS monitoring occasions; and receive the LP-C-WUS in an LP-C-WUS monitoring occasion of the one or more LP-C-WUS monitoring occasions.

28. The network node of claim 27, wherein the one or more processors, to receive the LP-C-WUS, are configured to cause the network node to:

receive the LP-C-WUS using a low-power wake-up radio (LP-WUR) of the network node while a main radio of the network node is in a sleep state, and wherein the one or more processors are further configured to:

switch the main radio to an active state in connection with reception of the LP-C-WUS; and communicate with the UE using the main radio while the main radio is in the active state.

29. A method of wireless communication performed by a user equipment (UE), comprising:

receiving, from a network node, an indication of a network capability for low power cell wake-up signal (LP-C-WUS) reception;

transmitting, to the network node, an indication of a UE capability for LP-C-WUS transmission;

receiving, from the network node, a cell discontinuous reception (DRX) configuration indicating one or more LP-C-WUS monitoring occasions and a plurality of non-low-power cell wake-up signal (non-LP C-WUS) monitoring occasions in a cell DRX cycle, wherein the one or more LP-C-WUS monitoring occasions includes a time window in which the network node is configured to monitor for an LP-C-WUS, and wherein the one or more LP-C-WUS monitoring occasions are scheduled between the plurality of non-LP C-WUS monitoring occasions; and transmitting, to the network node, the LP-C-WUS in an LP-C-WUS monitoring occasion of the one or more LP-C-WUS monitoring occasions.

30. A method of wireless communication performed by a network node, comprising:

transmitting an indication of a network capability for low power cell wake-up signal (LP-C-WUS) reception;

receiving an indication of a user equipment (UE) capability for LP-C-WUS transmission;

transmitting a cell discontinuous reception (DRX) configuration indicating one or more LP-C-WUS monitoring occasions and a plurality of non-low-power cell wake-up signal (non-LP C-WUS) monitoring occasions in a cell DRX cycle, wherein the one or more LP-C-WUS monitoring occasions includes a time window in which the network node is configured to monitor for an LP-C-WUS, and wherein the one or more LP-C-WUS monitoring occasions are scheduled between the plurality of non-LP C-WUS monitoring occasions; and receiving the LP-C-WUS in an LP-C-WUS monitoring occasion of the one or more LP-C-WUS monitoring occasions.

* * * * *